(12) United States Patent
Pitchaiah

(10) Patent No.: US 8,576,761 B1
(45) Date of Patent: Nov. 5, 2013

(54) POWER SAVE DELIVERY MECHANISM FOR WIRELESS COMMUNICATION TRAFFIC

(75) Inventor: Vijayaraja Pitchaiah, Thanjavur (IN)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 12/562,819

(22) Filed: Sep. 18, 2009

(51) Int. Cl.
*G08C 17/00* (2006.01)

(52) U.S. Cl.
USPC ........... 370/311; 370/328; 370/400; 455/574; 455/127.5

(58) Field of Classification Search
USPC ............... 370/311, 328, 400; 455/574, 127.1, 455/127.5
See application file for complete search history.

(56) References Cited

U.S. PATENT DOCUMENTS

| | | |
|---|---|---|
| 6,421,714 B1 | 7/2002 | Rai et al. |
| 6,570,857 B1 | 5/2003 | Haartsen et al. |
| 6,580,704 B1 | 6/2003 | Wellig et al. |
| 6,829,493 B1 | 12/2004 | Hunzinger |
| 6,836,472 B2 | 12/2004 | O'Toole et al. |
| 7,260,068 B2 | 8/2007 | Hsieh et al. |
| RE40,032 E | 1/2008 | Van Bokhorst et al. |
| 7,457,271 B2 | 11/2008 | Donovan |
| 7,505,795 B1 | 3/2009 | Lim et al. |
| 7,567,815 B2 | 7/2009 | Nishikawa et al. |
| 7,577,114 B2 | 8/2009 | Hsieh et al. |
| 7,804,849 B2 | 9/2010 | Mahany et al. |
| 7,864,720 B2 | 1/2011 | Jeyaseelan |
| 7,916,663 B2 | 3/2011 | Yee |
| 7,978,638 B2 | 7/2011 | Kim et al. |
| 7,995,507 B2 | 8/2011 | Singh et al. |
| 8,014,370 B2 | 9/2011 | Banerjea et al. |
| 8,023,522 B2 | 9/2011 | Gobriel et al. |
| 8,045,494 B2 | 10/2011 | Habetha et al. |
| 8,072,913 B2 | 12/2011 | Desai |
| 8,098,635 B2 | 1/2012 | Montojo et al. |
| 8,099,047 B2 | 1/2012 | David et al. |

(Continued)

FOREIGN PATENT DOCUMENTS

| | | |
|---|---|---|
| EP | 2157739 A1 | 2/2010 |
| WO | 2012078379 | 6/2012 |

OTHER PUBLICATIONS

IEEE, , "Wireless LAN Medium Access Control (MAC) and Physical Layer (PHY) Specifications", *IEEE Standard for Information Technology* Section 11.0, http://standards.ieee.org/getieee802/download/802.11-2007.pdf Jun. 12, 2007 , pp. 419-468.

(Continued)

*Primary Examiner* — Alvin Zhu
(74) *Attorney, Agent, or Firm* — DeLizio Gilliam, PLLC

(57) ABSTRACT

In accordance with unscheduled automatic power save delivery (U-APSD) mechanisms, an access point typically creates an unscheduled service period irrespective of availability of downlink data packets for a WLAN device. This can result in a large overhead that can limit the performance and throughput of the WLAN device. Functionality can be implemented on the access point and/or on the WLAN device so that the access point suppresses creating the service period (and transmitting an indication of an end of the service period) when there are no downlink data packets for the WLAN device. In some implementations, configuring the access point to defer creating the service period until it is determined that the WLAN device has transmitted all scheduled uplink data packets, or until the access point has available downlink data, can facilitate conservation of radio resources, and reduce power consumption.

28 Claims, 9 Drawing Sheets

(56) References Cited

U.S. PATENT DOCUMENTS

| | | | |
|---|---|---|---|
| 8,112,650 B2 | 2/2012 | Qing et al. | |
| 8,233,462 B2 | 7/2012 | Walton et al. | |
| 2002/0045435 A1 | 4/2002 | Fantaske | |
| 2002/0164963 A1 | 11/2002 | Tehrani et al. | |
| 2005/0135284 A1 | 6/2005 | Nanda et al. | |
| 2005/0136914 A1 | 6/2005 | Van Kampen et al. | |
| 2005/0152324 A1* | 7/2005 | Benveniste | 370/338 |
| 2005/0286454 A1* | 12/2005 | Morimoto et al. | 370/311 |
| 2006/0029024 A1* | 2/2006 | Zeng et al. | 370/335 |
| 2007/0077936 A1 | 4/2007 | Tomisawa et al. | |
| 2007/0171910 A1 | 7/2007 | Kumar | |
| 2008/0069021 A1 | 3/2008 | Chhabra | |
| 2009/0016248 A1 | 1/2009 | Li et al. | |
| 2009/0073945 A1 | 3/2009 | Seok | |
| 2009/0097438 A1* | 4/2009 | Kneckt et al. | 370/328 |
| 2009/0196211 A1 | 8/2009 | Wentink | |
| 2009/0310578 A1 | 12/2009 | Convertino et al. | |
| 2010/0070767 A1 | 3/2010 | Walker et al. | |
| 2010/0118797 A1 | 5/2010 | Park et al. | |
| 2010/0128701 A1 | 5/2010 | Nagaraja | |
| 2010/0153727 A1 | 6/2010 | Reznik et al. | |
| 2010/0189021 A1 | 7/2010 | He et al. | |
| 2010/0254290 A1 | 10/2010 | Gong et al. | |
| 2010/0284316 A1 | 11/2010 | Sampathkumar | |
| 2010/0325459 A1 | 12/2010 | Kangude et al. | |
| 2011/0051638 A1 | 3/2011 | Jeon et al. | |
| 2011/0086662 A1* | 4/2011 | Fong et al. | 455/517 |
| 2011/0158142 A1 | 6/2011 | Gong et al. | |
| 2011/0237294 A1 | 9/2011 | Hussain | |
| 2011/0280170 A1 | 11/2011 | Bowser et al. | |
| 2012/0021735 A1 | 1/2012 | Maeder et al. | |
| 2012/0151089 A1 | 6/2012 | Ponmudi et al. | |
| 2013/0028206 A1 | 1/2013 | Cho et al. | |
| 2013/0204936 A1 | 8/2013 | El et al. | |
| 2013/0238919 A1 | 9/2013 | Ponmudi et al. | |

OTHER PUBLICATIONS

IEEE, , "Wireless Lan Medium Access Control (MAC) and Physical Layer (PHY) Specifications", *IEEE Standard for Information Technology* Section 7.0, http://standards.ieee.org/getieee802/download/802.11-2007.pdf Jun. 12, 2007 , pp. 59-154.

U.S. Appl. No. 12/768,912, filed Apr. 28, 2010, Liu, Xiangyang.
U.S. Appl. No. 12/492,405 Office Action, Sep. 27, 2012, 10 Pages.
U.S. Appl. No. 12/727,610 Office Action, Aug. 2, 2012, 20 Pages.
U.S. Appl. No. 12/768,434 Office Action, Oct. 15, 2012, 11 pages.
U.S. Appl. No. 12/768,912 Office Action, Sep. 7, 2012, 23 Pages.
Co-pending U.S. Appl. No. 12/705,267, filed Feb. 12, 2010.
Co-pending U.S. Appl. No. 12/727,610, filed Mar. 19, 2010.
Co-pending U.S. Appl. No. 12/768,434, filed Apr. 27, 2010.
Co-pending U.S. Appl. No. 12/963,160, filed Dec. 8, 2010.
Co-pending U.S. Appl. No. 13/088,081, filed on Apr. 15, 2011.

IEEE Standard for Information technology—Telecommunications and information exchange between systems—Local and metropolitan area networks—Specific requirements—Part 11: Wireless LAN Medium Access Control (MAC) and Physical Layer (PHY) Specifications, IEEE Std 802.11-2007 (Revision of IEEE Std 802.11-1999) http://standards.ieee.org/getieee802/download/802.11-2007.pdf. (Date Obtained from Internet Oct. 21, 2009) Jun. 12, 2007 , 254 pages.

"IEEE Std 802.11z: IEEE Standard for Information Technology—Amendment 7: Extensions to Direct-Link Setup", IEEE Computer Society 3 Park Avenue New York, NY 10016-5997 http://ieeexplore.ieee.org/xpl/freeabs alljspamumber=5605400 Oct. 14, 2010, 96 pages.

International Search Report and Written Opinion—PCT/US2011/062154—ISA/EPO—Mar. 6, 2012.

Jung Eun-Sun et al., "A Power Control MAC Protocol for Ad Hoc Networks", 2002 , 12 pages.

"U.S. Appl. No. 12/492,405 Office Action", Mar. 15, 2012 , 9 pages.
"U.S. Appl. No. 12/705,267 Office Action", Mar. 22, 2012 , 11 pages.
Co-pending U.S. Appl. No. 13/413,011, filed Mar. 6, 2012.
"U.S. Appl. No. 12/963,160 Office Action", Apr. 16, 2013 , 25 pages.
"U.S. Appl. No. 13/088,081 Non-Final Office Action", Apr. 24, 2013 , 14 pages.
U.S. Appl. No. 12/727,610 Final Office Action, Jan. 7, 2013, 24 pages.
"U.S. Appl. No. 12/768,434 Final Office Action", Mar. 20, 2013 , 15 pages.
"U.S. Appl. No. 12/768,912 Final Office Action", Feb. 22, 2013 , 27 Pages.

""IEEE Standard for Information Technology—Telecommunications and information exchange between systems—Local and metropolitan area networks—Specific requirements"", Part 11: Wireless LAN Medium Access Control (MAC) and Physical Layer (PHY) specifications Amendment 7: Extensions to Direct-Link Setup (DLS) Standard, IEEE, Piscataway, NJ. USA, Oct. 14, 2010. pp. 1-96.

"IEEE Standard for Information technology—Telecommunications and information exchange between systems—Local and metropolitan area networks-Specific requirement—Part 11: Wireless LAN Medium Access Control (MAC) and Physical Layer (PHY) Specifications", IEEE Std 802.11-2007 (Revision of IEEE Std 802.11-1999) Section 11; http://standards.ieee.org/getieee802/download/802.11-2007.pdf. (Date Obtained from Internet Apr. 6, 2010) Jun. 12, 2007 , pp. 468-517.

"PCT Application No. PCT/US2011/062154 International Preliminary Report on Patentability", Jun. 20, 2013, 8 pages.

"PCT Application No. PCT/US2013/029377 International Search Report", Jun. 17, 2013, 11 pages.

"U.S. Appl. No. 12/963,160 Final Office Action", Aug. 15, 2013, 19 pages.

Co-pending U.S. Appl. No. 13/955,779, filed Jul. 31, 2013, 44 pages.
Co-pending US Application No. 113/966,870, filed Sep. 14, 2013, 47 pages.

* cited by examiner

POWER SAVE DELIVERY MECHANISM FOR WIRELESS COMMUNICATION TRAFFIC

BACKGROUND

Embodiments of the inventive subject matter generally relate to the field of wireless communication and, more particularly, to a power save mechanism for wireless communication traffic.

Unscheduled automatic power save delivery (U-APSD) can be implemented on a wireless local area network (WLAN) device to ensure quality of service (QoS) by prioritizing traffic (e.g., voice, video, etc.) exchanged between the WLAN device and an access point. In U-APSD, data transmitted from the WLAN device to the access point (uplink data) is used to trigger the access point. When the access point receives the uplink data, the access point starts an unscheduled service period and transmits buffered downlink data (if available) to the WLAN station. At the end of the service period, the access point transmits an end of service period (EOSP) notification to indicate that the access point has no buffered downlink data to transmit.

SUMMARY

Various embodiments are disclosed for reducing power consumption associated with wireless communication traffic. In one embodiment, an access point receives, from a WLAN device an uplink data packet. Uplink data may be defined as data that is received by the access point from the WLAN device. The access point may determine, based on information included in the uplink data packet, whether the WLAN device has an additional uplink data packet to transmit to the access point. The access point may also determine whether the access point has a downlink data packet to transmit to the WLAN device. Downlink data may be defined as data that is transmitted by the access point to the WLAN device. The access point can suppress creating a service period and transmitting an indication of an end of the service period, in response to determining that the WLAN device has an additional uplink data packet to transmit to the access point and determining that the access point does not have a downlink data packet to transmit to the WLAN device. The access point may then receive the additional uplink data packet from the WLAN device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
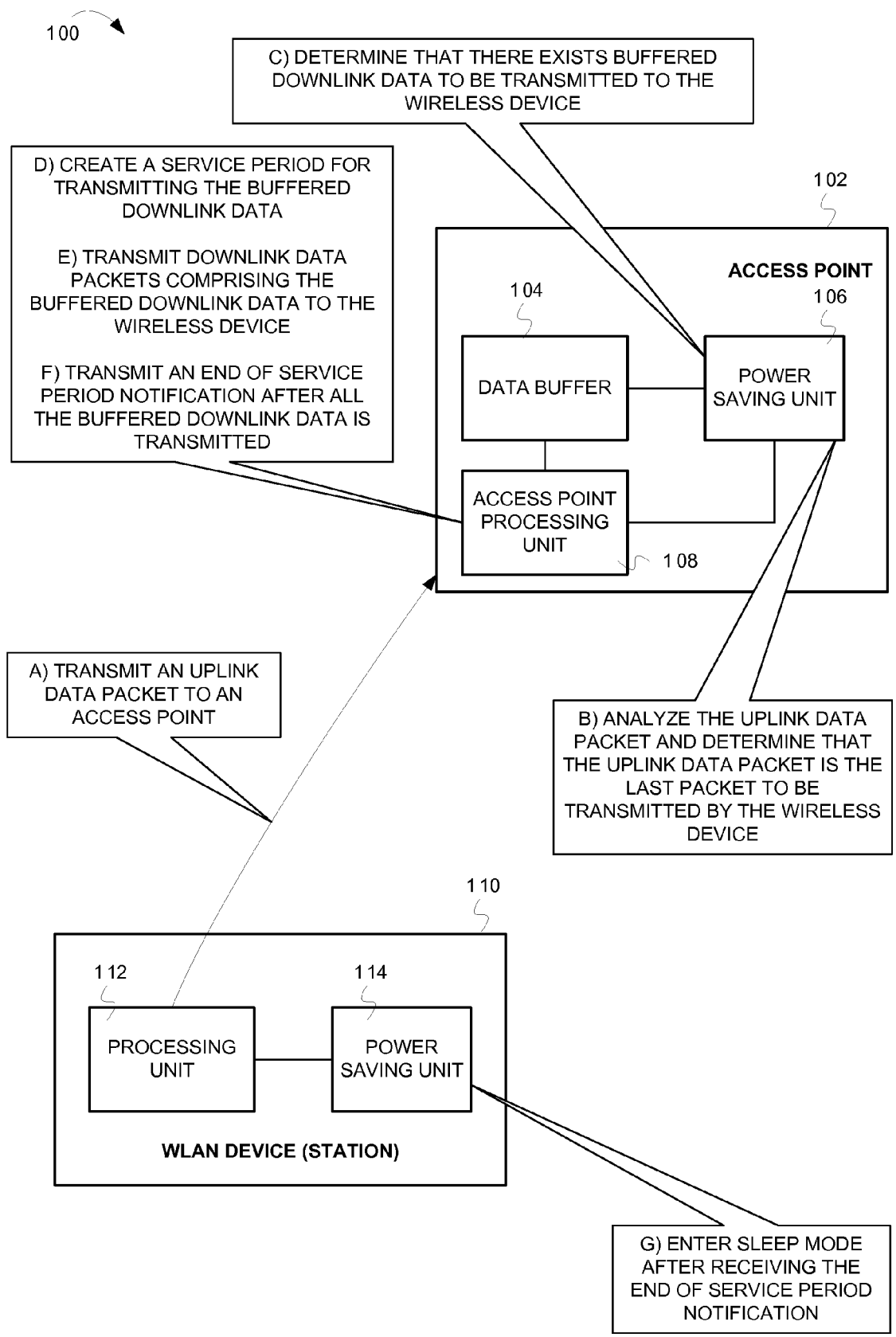
FIG. 1 is a conceptual diagram illustrating a power save mechanism for a WLAN device.

The description that follows includes exemplary systems, methods, techniques, instruction sequences, and computer program products that embody techniques of the present inventive subject matter. However, it is understood that the described embodiments may be practiced without these specific details. For instance, although examples refer to techniques for power conservation in a WLAN device, techniques for power conservation as described below may be implemented for other wireless standards and devices, e.g., WiMAX, ZigBee®, Wireless USB devices, etc. In other instances, well-known instruction instances, protocols, structures, and techniques have not been shown in detail in order not to obfuscate the description.

Implementing U-APSD for power conservation on a WLAN device generally results in additional overhead. Typically, an access point creates a service period on receiving an uplink data packet and transmits an end of service period (EOSP) notification in a QOS null frame to indicate the end of the service period, irrespective of whether or not the access point transmits downlink data packets to the WLAN device. Additionally, the WLAN device also transmits an acknowledgement for the EOSP notification. A large overhead may be incurred as a result of the access point creating the service period and transmitting the EOSP notification, the WLAN device transmitting the acknowledgement, and the access point retransmitting the EOSP notification if the acknowledgement is not received. The large overhead can limit the performance of the WLAN device, as the WLAN device may not achieve its maximum throughput.

A power saving mechanism for efficient transmission of downlink data packets can be implemented on both the WLAN device and the access point. In one implementation, the power saving mechanism can be configured so that the access point suppresses creating a service period and transmitting an EOSP after each uplink data packet when there are no downlink data packets for the WLAN device. In another implementation, the power saving mechanism can be configured so that the access point defers transmitting the EOSP notification when there are no downlink data packets for the WLAN device. By means of the power saving mechanism, the EOSP notification may be transmitted to the WLAN device on determining that the WLAN device has transmitted all the uplink data packets. The power saving mechanism enables the WLAN device to use time and bandwidth formerly spent in receiving the EOSP notification and transmitting the acknowledgment for the EOSP (even in the absence of downlink data packets), to transmit the uplink data packets. This can increase the speed with which the uplink data packets are processed, eliminate retransmission of unnecessary EOSP notifications and acknowledgements, and reduce processing time, checksum calculation time, etc., thereby reducing power consumption. The power saving mechanism, when implemented on the WLAN device, can reduce power consumption by reducing warm up power and warm up time associated with the WLAN device by minimizing frequent switching between an active and inactive state. The power saving mechanisms can therefore improve throughput, facilitate conservation of radio resources, and reduce power consumption.

FIG. 1 is a conceptual diagram illustrating a power save mechanism for a WLAN device. FIG. 1 comprises an access point 102 and a WLAN device 110. The WLAN device 110 and the access point 102 can communicate with each other via a wireless communication network. The WLAN device 110 may be located on various suitable electronic devices such as a fixed transmitting station, personal computer (PC), a laptop, a netbook, a portable gaming console, a mobile phone, a personal digital assistant (PDA), etc. The WLAN device 110 comprises a processing unit 112 coupled to a power saving unit 114. The access point 102 comprises a data buffer 104, a power saving unit 106, and an access point processing unit 108. The power saving unit 106 is coupled to the data buffer 104 and the access point processing unit 108. The access point processing unit 108 is further coupled to the data buffer 104.

At stage A, the processing unit 112 transmits an uplink data packet to the access point 102. The processing unit 112 may transmit the uplink data packet after the WLAN device 110 exits a sleep mode. In some implementation, the power saving unit 114 may prompt the processing unit 112 to exit the sleep mode at an appropriate time instant. The processing unit 112 may access a WLAN transmit queue, retrieve the uplink data packet to be transmitted, and transmit the uplink data packet to the access point 102.

At stage B, the power saving unit 106 on the access point 102 analyses the uplink data packet and determines that the uplink data packet is the last packet that will be transmitted by the WLAN device 110. In some implementations, the access point processing unit 108 may receive the uplink data packet, retrieve content of requisite data fields from the uplink data packet, and transmit the content of the requisite data fields to the power saving unit 106. For example, the access point processing unit 108 may retrieve content of a frame control field or a QoS capability information field and transmit the retrieved content to the power saving unit 108. The power saving unit 108 can determine, based on the retrieved content, whether the WLAN device 110 will be transmitting additional uplink data packets. For example, the power saving unit 106 may determine that a "more data" (MD) bit in the frame control field is equal to zero (MD=0) indicating that the WLAN device 110 will not transmit additional uplink data packets.

At stage C, the power saving unit 106 determines that there exist buffered downlink data to be transmitted to the WLAN device 110. The power saving unit 106 can query the access point processing unit 108 to determine whether there exists buffered data to be transmitted on the downlink. The access point processing unit 108 may access the data buffer 104, determine whether there exists buffered downlink data for the WLAN device 110, and accordingly notify the power saving unit 106. The power saving unit 106 may direct the access point processing unit 108 to create a service period for transmitting the buffered downlink data. The power saving unit 106 may also direct the access point processing unit 108 to notify the WLAN device 110 of available buffered downlink data. The access point processing unit 108 may notify the WLAN device 110 of the available buffered downlink data in an acknowledgement for the uplink data packet. For example, the access point processing unit 108 may set a more bit (MB) in the acknowledgement (MB=1) to indicate the available buffered downlink data.

At stage D, the access point processing unit 108 creates a service period for transmitting the buffered downlink data. Although the uplink data packet acts as a trigger for transmitting the buffered downlink data, the access point processing unit 108 may create the service period only if there exists buffered downlink data to be transmitted. In some implementations, the access point processing unit 108 may not transmit the buffered downlink data until the WLAN device 110 specifically requests the buffered downlink data and/or the WLAN device 110 indicates that additional uplink data packets will not be transmitted. For example, the WLAN device 110 can indicate that additional uplink data packets will not be transmitted by indicating MD=0 in the frame control field.

In another implementation, the WLAN device 110 may query the access point 102 regarding the available buffered downlink data by setting a More data acknowledgement (MD_ACK) bit in the QoS Capability information field (MD_ACK=1). The power saving unit 106 may direct the access point processing unit 108 to identify and transmit the buffered downlink data on determining that the MD_ACK bit equals "1".

At stage E, the access point processing unit 108 transmits downlink data packets, comprising the buffered downlink data, to the wireless device 110. Prior to transmitting the downlink data packets, the access point processing unit 108 may also perform operations to encapsulate the buffered downlink data into one or more downlink data packets. The access point processing unit 108 may fragment the buffered downlink data (if required), encrypt the data, and encapsulate the data in packet headers to generate the downlink data packets. Additionally, the access point processing unit 108 may also indicate, in the header of the downlink data packet, whether additional downlink data packets will be transmitted in the service period. For example, the access point processing unit 108 may transmit MB=1 in a first downlink data packet if a second downlink data packet is available.

At stage F, the access point processing unit 108 transmits an end of service period (EOSP) notification after all the buffered downlink data has been transmitted to the WLAN device 110. The access point processing unit 108 may set an EOSP flag (EOSP=1) in a QoS Null frame in a final downlink data packet to indicate that no additional downlink data packets will be transmitted and to indicate an end of the service period.

At stage G, the power saving unit 114 enters the sleep mode after receiving the EOSP notification. The power saving unit 114 may direct the processing unit 112 and other components of the WLAN device 110 to enter the sleep mode. The processing unit 112 may enter the sleep mode after transmitting an acknowledgement for the EOSP notification. The power saving unit 114 may direct the processing unit 112 to exit the sleep mode after a pre-defined sleep interval has elapsed. In some implementations, the power saving unit 114 may monitor a WLAN data buffer and direct the processing unit 112 to exit the sleep mode if the power saving unit 114 determines that there exists data to be transmitted to the access point 102.

Figure 2:
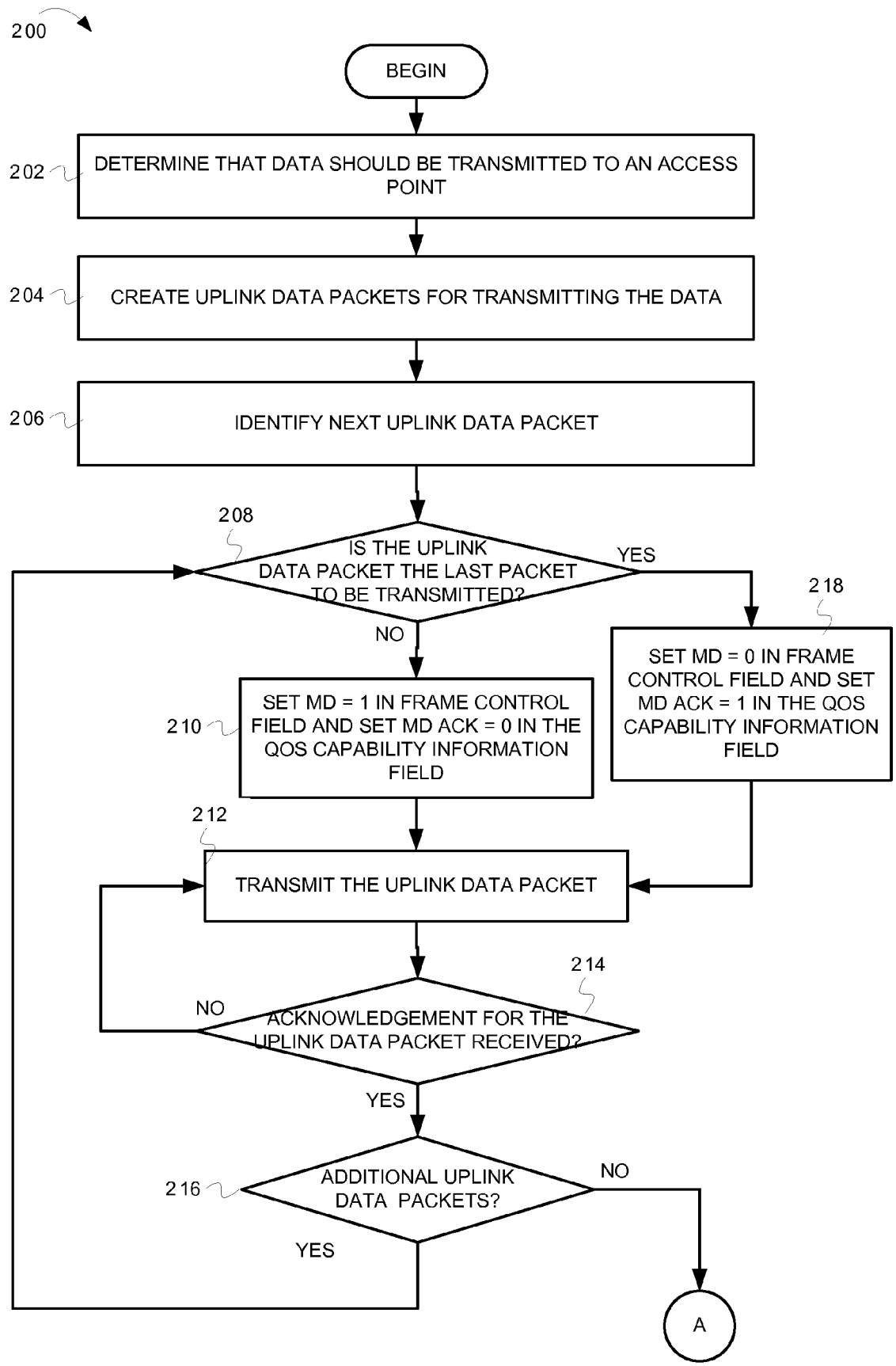
FIG. 2 is a flow diagram illustrating example operations for a WLAN device configured in a No Data No Service period (NDNS) mode.
Figure 3:
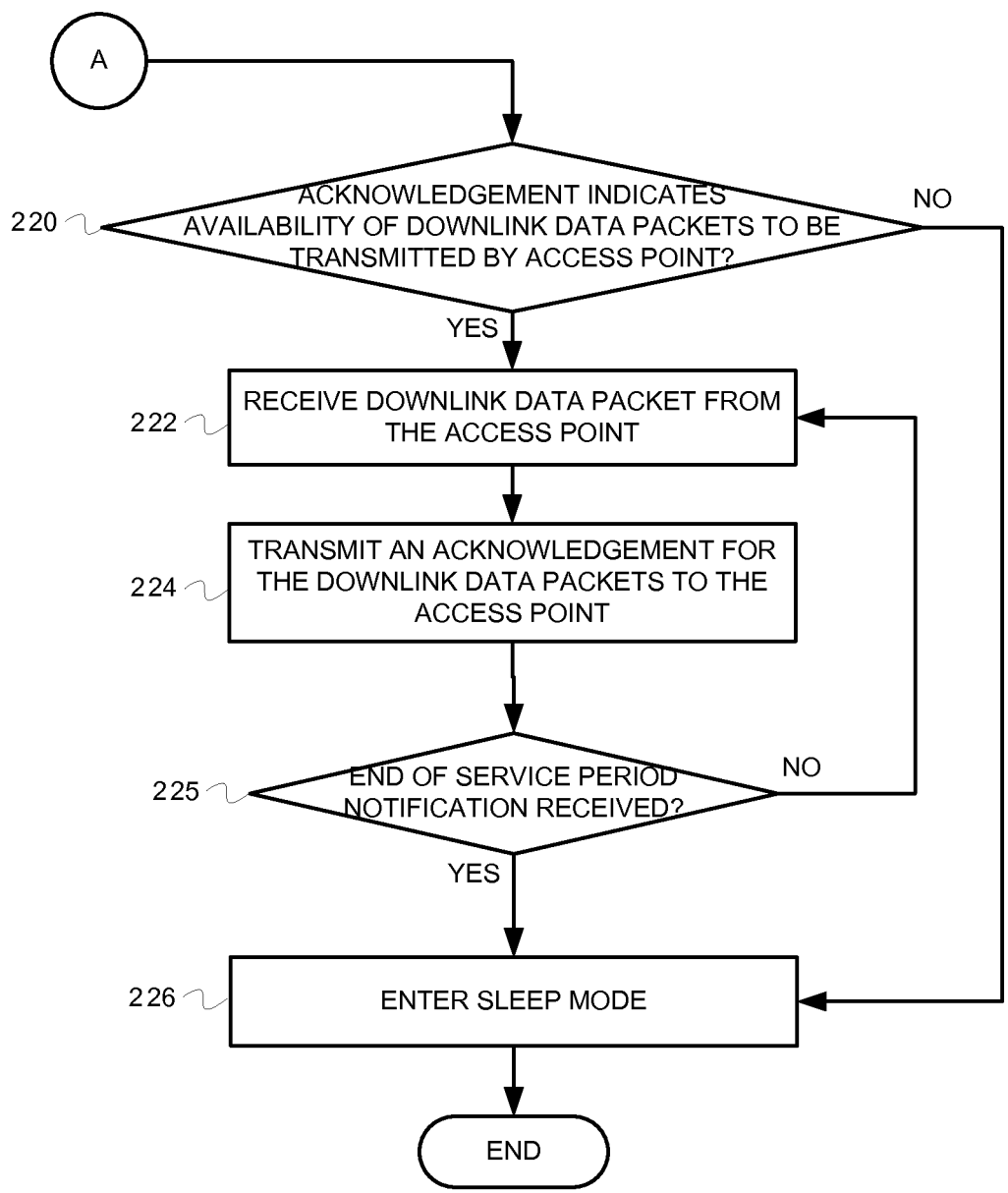
FIG. 3 is a flow diagram illustrating example operations for a WLAN device configured in the NDNS mode.

FIG. 2 and FIG. 3 are flow diagrams illustrating example operations for a WLAN device configured in a No Data No Service period (NDNS) mode. In the NDNS mode, an access point suppresses creating a service period if there is no buffered downlink data for the WLAN device. In other words, the access point may not create a service period and transmit an EOSP notification after each uplink data packet. Flow 200 begins at block 202 in FIG. 2.

At block 202, it is determined that data should be transmitted to an access point. For example, the power saving unit 114 of FIG. 1 may determine that data should be transmitted to the access point 102. The power saving unit 114 may determine that data should be transmitted based on querying a WLAN data buffer, directing a processing unit 112 to identify the data to be transmitted, etc. In one implementation, the processing unit 112 may access the WLAN data buffer and determine that the data should be transmitted to the access point 102. The flow continues at block 204.

At block 204, uplink data packets for transmitting the data are created. In one implementation, the processing unit 112 may create the uplink data packets for transmitting the data to the access point 102. In some implementations, the power saving unit 114 may detect the data to be transmitted (e.g., based on monitoring the WLAN data buffer) and direct the processing unit 112 to exit a sleep mode and create the uplink data packets. The flow continues at block 206.

At block 206, a next uplink data packet is identified. For example, the processing unit 112 may identify the next uplink data packet from a WLAN transmit queue. In some implementation, the processing unit 112 may retrieve a part or all of the data to be transmitted (e.g., from the WLAN data buffer) and encapsulate the data in packet headers to create the next uplink data packet. The flow continues at block 208.

At block 208, it is determined whether the uplink data packet is the last packet to be transmitted. For example, the processing unit 112 may access the WLAN transmit queue to determine whether the uplink data packet is the last packet to be transmitted. The processing unit 112 may also notify the power saving unit 114 regarding whether or not the next uplink data packet is the last packet to be transmitted. In some implementations, the processing unit 112 may retrieve the data from the WLAN data buffer and determine whether the data can be transmitted in a single uplink data packet. If it is determined that the uplink data packet is the last packet to be transmitted, the flow continues at block 218. Otherwise, the flow continues at block 210.

At block 210, a more data (MD) bit in a frame control field is set to "1" and a more data acknowledgement (MD_ACK) bit in the QoS capability information field is set to "0". In one implementation, the MD bit can be used to indicate whether there exist additional uplink data packets to be transmitted to the access point. By setting MD=1, the processing unit 112 informs the access point 102 that there exists at least one more uplink data packet to be transmitted. In one implementation, the MD_ACK bit can be used to query the access point 102 regarding the availability of downlink data packets. By setting MD_ACK=0, the processing unit 112 can direct the access point 102 to not identify or transmit the downlink data packets. It is noted that in some implementations the access point 102 may not check for the availability of downlink data packets unless requested by the WLAN device 110 (e.g., by setting MD_ACK=1). Additionally, the processing unit 112 may also set a power management (PM) flag to "0" to indicate that WLAN device 110 will not be entering a low powered state. The flow continues at block 212.

At block 212, the uplink data packet is transmitted. For example, the processing unit 112 may transmit the uplink data packet to the access point 102. The flow continues at block 214.

At block 214, it is determined whether an acknowledgment for the uplink data packet has been received. For example, the processing unit 112 may determine whether the acknowledgement for the uplink data packet has been received from the access point 102. The processing unit 112 may wait for a pre-defined time interval to receive the acknowledgement. If it is determined that the acknowledgment for the uplink data packet has been received, the flow continues at block 216. Otherwise, the flow continues at block 212, where processing unit 112 assumes that the uplink data packet was dropped and retransmits the uplink data packet.

At block 216, it is determined whether there exist additional uplink data packets to be transmitted. For example, the processing unit 112 may determine whether there exist additional uplink data packets. The processing unit 112 may access the WLAN transmit queue to determine whether the WLAN transmit queue comprises uplink data packets to be transmitted. Alternatively, the processing unit 112 may access the WLAN data buffer to determine whether there exists additional data to be transmitted. If it is determined that there exist additional uplink data packets to be transmitted, the flow continues at block 208, where it is determined and accordingly indicated, to the access point 102, whether the uplink data packet is the last packet. Otherwise, the flow continues at block 220 in FIG. 3.

At block 218, the MD bit in the frame control field is set to "0" and the MD_ACK bit in the QoS capability information field is set to "1". The flow 200 moves from block 208 in FIG. 2 to block 218 if it is determined that the uplink data packet is the last packet to be transmitted. By setting MD=0, the processing unit 112 informs the access point 102 that the processing unit 112 will not transmit additional uplink data packets (i.e., there is no data to be transmitted to the access point 102). By setting MD_ACK=1, the processing unit 112 directs the access point 102 to identify and transmit the downlink data packets. On detecting MD_ACK=1, the access point 102 may access the data buffer 104 and determine whether there exists buffered downlink data for the WLAN device 110. If so, the access point 102 may retrieve the buffered downlink data, generate one or more downlink data packets, and transmit the downlink data packets as will be further described in FIG. 4. Additionally, the processing unit 112 may also set the PM flag to "0" to indicate that WLAN device 110 will remain in an active state to receive the downlink data packets. The flow continues at block 212 where the uplink data packet is transmitted.

At block 220, it is determined whether the acknowledgement from the access point indicates the availability of downlink data packets to be transmitted by the access point. In one implementation, the power saving unit 114 may determine whether the acknowledgement from the access point indicates the availability of downlink data packets. The processing unit 112 may retrieve content of requisite data fields from the acknowledgement and provide the content of the requisite data fields to the power saving unit 114. For example, in response to receiving a query for the availability of downlink data packets, the access point 102 may transmit the acknowledgement and set a more bit (MB) in the acknowledgement to indicate the availability of downlink data packets. The processing unit 112 may retrieve the content of the MB bit and provide the content of the MB bit (e.g., MB=1, MB=0) to the power saving unit 114. The power saving unit 114 can accordingly control further operations of the processing unit 112. For example, if MB=1, the power saving unit 114 may direct the processing unit 112 to remain in an active mode and receive the downlink data packets. If it is determined that acknowledgement from the access point indicates the availability of the downlink data packets, the flow continues at block 222. Otherwise, the flow continues at block 226.

At block 222, a downlink data packet is received from the access point. For example, the processing unit 114 may receive the downlink data packet from the access point 102. The flow continues at block 224.

At block 224, an acknowledgement for the downlink data packet is transmitted to the access point. For example, the processing unit 114 may transmit the acknowledgement for the downlink data packet to the access point 102. The flow continues at block 225.

At block 225, it is determined whether an end of service period notification has been received. For example, the processing unit 112 may determine whether the downlink data packet comprises an EOSP notification. The access point 102 may use the EOSP notification to indicate that additional downlink data packets will not be transmitted. If it is determined that the end of service period notification has not been received, the flow continues at block 222, where a next downlink data packet is received. Otherwise, the flow continues at block 226.

At block 226, the WLAN device enters sleep mode. For example, the power saving unit 114 may direct the processing unit 112 to enter the sleep mode in response to receiving the EOSP notification. The flow 200 also moves from block 220 in FIG. 3 to block 226 if it is determined that there are no downlink data packets. It should be noted that the EOSP notification may not be transmitted if there are no downlink data packets. In some implementations, the power saving unit 114 may set the PM bit equal to "1" in an acknowledgement for the EOSP notification to indicate that the WLAN device 110 is in the sleep mode. From block 226, the flow ends.

Figure 4:
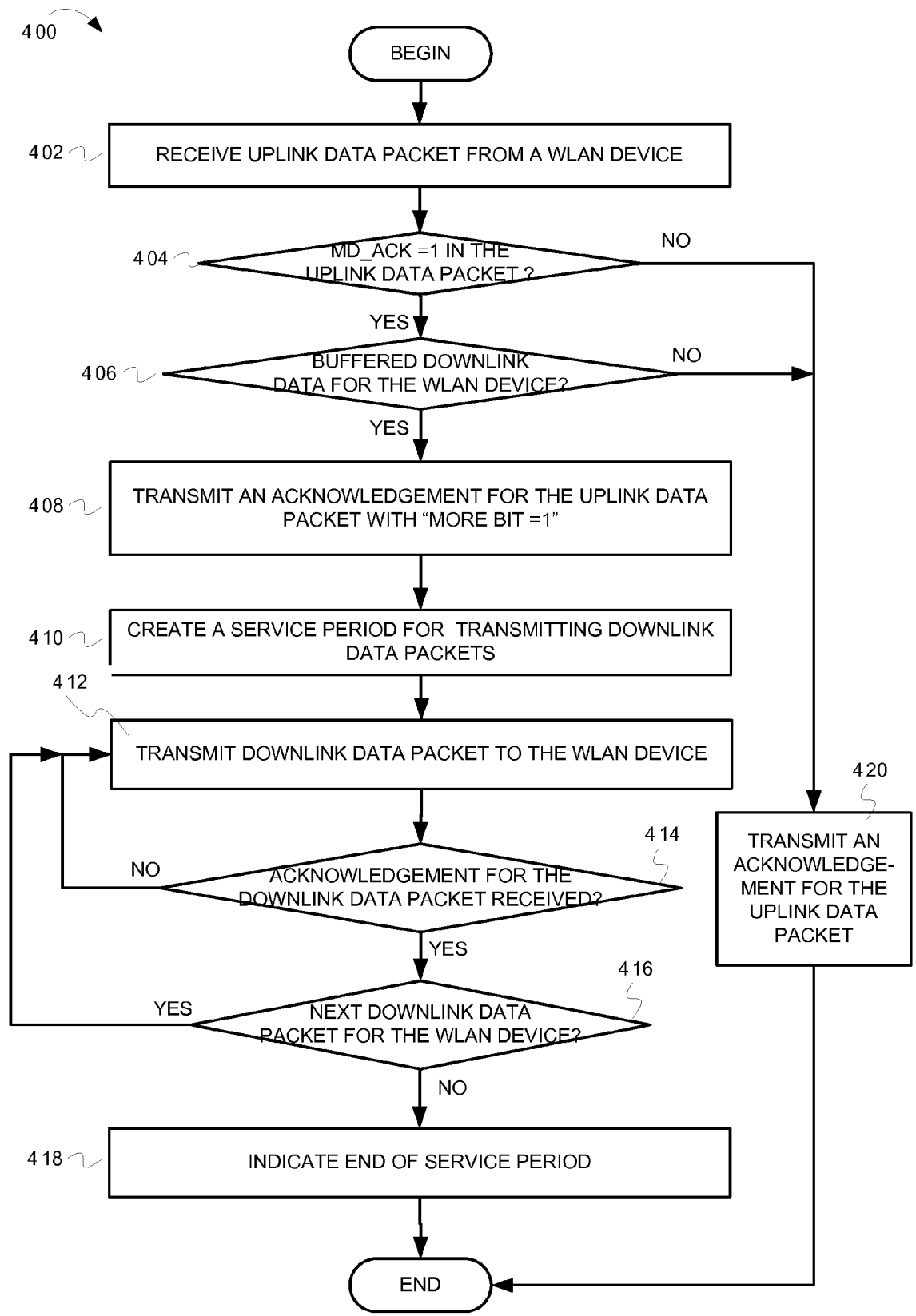
FIG. 4 is a flow diagram illustrating example operations for an access point configured in an NDNS mode.

FIG. 4 is a flow diagram illustrating example operations for an access point configured in an NDNS mode. The flow 400 begins at block 402.

At block 402, an uplink data packet is received at an access point from a WLAN device. For example, the access point processing unit 108 of the access point 102 (shown in FIG. 1) may receive the uplink data packet from the WLAN device 110. The uplink data packet may act as a trigger and indicate that the WLAN device 110 is in an active state. The flow continues at block 404.

At block 404, it is determined whether an MD_ACK bit equals "1" in the uplink data packet. For example, the power saving unit 106 of FIG. 1 may determine whether MD_ACK=1 in the uplink data packet. In some implementations, the access point processing unit 108 may retrieve the value of the MD_ACK bit from a QoS Capability Information field in the uplink data packet header and transmit the value of the MD_ACK bit to the power saving unit 106. The power saving unit 106 may instruct the access point processing unit 108 regarding further operations based on the value of the MD_ACK bit. If it is determined that the MD_ACK bit equals "1" in the uplink data packet, the flow continues at block 406. Otherwise, the flow continues at block 420.

At block 406, it is determined whether there exists buffered downlink data for the WLAN device. In one implementation, on determining that MD_ACK=1 in the uplink data packet, the power saving unit 106 may direct the access point processing unit 108 to determine whether there exists buffered downlink data for the WLAN device 110. The access point processing unit 108 may access a data buffer 104 to determine whether there exists buffered downlink data for the WLAN device 110. If it is determined that there exists buffered downlink data for the WLAN device 110, the flow continues at block 408. Otherwise, the flow continues at block 420.

At block 408, an acknowledgement for the uplink data packet is transmitted with a more bit (MB) in the acknowledgement equal to "1". The access point 102 can use the more bit to indicate whether or not there exists buffered downlink data for the WLAN device 110 in response to receiving the MD_ACK=1 indication in the uplink data packet. Setting MB=1, indicates to the WLAN device 110 that there exists buffered downlink data for the WLAN device 110. Setting MB=1 also indicates that the access point 102 will create a service period and transmit the buffered downlink data in one or more downlink data packets. In one implementation, the power saving unit 106 may direct the access point processing unit 108 to transmit the downlink data packets comprising the buffered downlink data immediately after the acknowledgement with MB=1 is transmitted. In another implementation, the power saving unit 106 may direct the access point processing unit 108 to defer transmitting the downlink data packets until the WLAN device 110 transmits all the uplink data packets. The flow continues at block 410.

At block 410, a service period for transmitting the downlink data packets is created. For example, the access point processing unit 108 may create the service period for transmitting the downlink data packets to the WLAN device 110. In one implementation, the power saving unit 106 may direct the access point processing unit 108 to create the service period. The service period can indicate a time interval during which the access point 102 transmits the downlink data packets comprising the buffered downlink data to the WLAN device 110. The flow continues at block 412.

At block 412, a downlink data packet is transmitted to the WLAN device. For example, the access point processing unit 108 may transmit the downlink data packet to the WLAN device 110. The access point processing unit 108 may identify the next downlink data packet from an access point transmit queue. In some implementations, the access point processing unit 108 may retrieve (from the data buffer 104) a part or all of the buffered downlink data and encapsulate the retrieved data in packet headers to create the next downlink data packet. The flow continues at block 414.

At block 414, it is determined whether an acknowledgment for the downlink data packet is received. For example, the access point processing unit 108 may determine whether the acknowledgment for the downlink data packet was received from the WLAN device 110. The access point processing unit 108 may wait for a pre-defined time interval to receive the acknowledgement. If it is determined that the acknowledgment for the downlink data packet has been received, the flow continues at block 416. Otherwise, the flow continues at block 412, where the access point processing unit 108 assumes that the downlink data packet was dropped and retransmits the downlink data packet.

At block 416, it is determined whether there exists a next downlink data packet for the WLAN device. In one implementation, the access point processing unit 108 may determine whether there exist additional downlink data packets for the WLAN device 110. For example, the access point processing unit 108 may access the data buffer 104 and determine that there exists buffered downlink data for the WLAN device 110. As another example, the access point processing unit 108 may consult the access point transmit queue to determine that there exist additional downlink data packets for the WLAN device 110. In another implementation, the power saving unit 106 can determine whether or not there exists the downlink data packet for the WLAN device 110. On determining that there exists the downlink data packet for the WLAN device, the power saving unit 106 can direct the access point processing unit 108 to retrieve and transmit the downlink data packet. On determining that there is no downlink data packet for the WLAN device 110, the power saving unit 106 can direct the access point processing unit 108 to indicate an end of the service period. If it is determined that there exists the next downlink data packet for the WLAN device 110, the flow continues at block 412, where the next downlink data packet is retrieved and transmitted to the WLAN device 110. Otherwise, the flow continues at block 418.

At block 418, the end of the service period is indicated. For example, the access point processing unit 108 may indicate the end of the service period. In some implementations, the access point processing unit 108 may transmit an EOSP notification in a QoS Null frame as part of a last downlink data packet transmitted to the WLAN device 110. In another implementation, the access point processing unit 108 may create the QoS Null frame and transmit the EOSP notification after transmitting the last downlink data packet. From block 418, the flow ends.

At block 420, an acknowledgment for the uplink data packet is transmitted. For example, the access point processing unit 108 may transmit the acknowledgment to the WLAN device 110. The flow 400 moves from block 404 to block 420 if it is determined that MD_ACK=0 in the uplink data packet. The power saving unit 106 can direct the access point processing unit 108 to transmit the acknowledgment without determining whether there exist downlink data packets for the WLAN device 110. The acknowledgment may not comprise an indication of whether or not there exist downlink data packets for the WLAN device 110. The flow 400 also moves from block 406 to block 420, if is determined that there is no buffered downlink data for the WLAN device 110. On determining that there is no buffered downlink data for the WLAN device or that there are no downlink data packets for the WLAN device 110, the access point 102 may indicate the absence of downlink data packets in the acknowledgment for the uplink data packet. For example, the access point 102 may receive an indication to retrieve and transmit the downlink data packets (e.g., an MD_ACK=1 indication), determine that there are no downlink data packets to be transmitted, and transmit the acknowledgement for the uplink data packet with MB=0. Additionally, the power saving unit 106 may also direct the access point processing unit 108 to not create a service period if there are no downlink data packets. From block 420, the flow ends.

Figure 5:
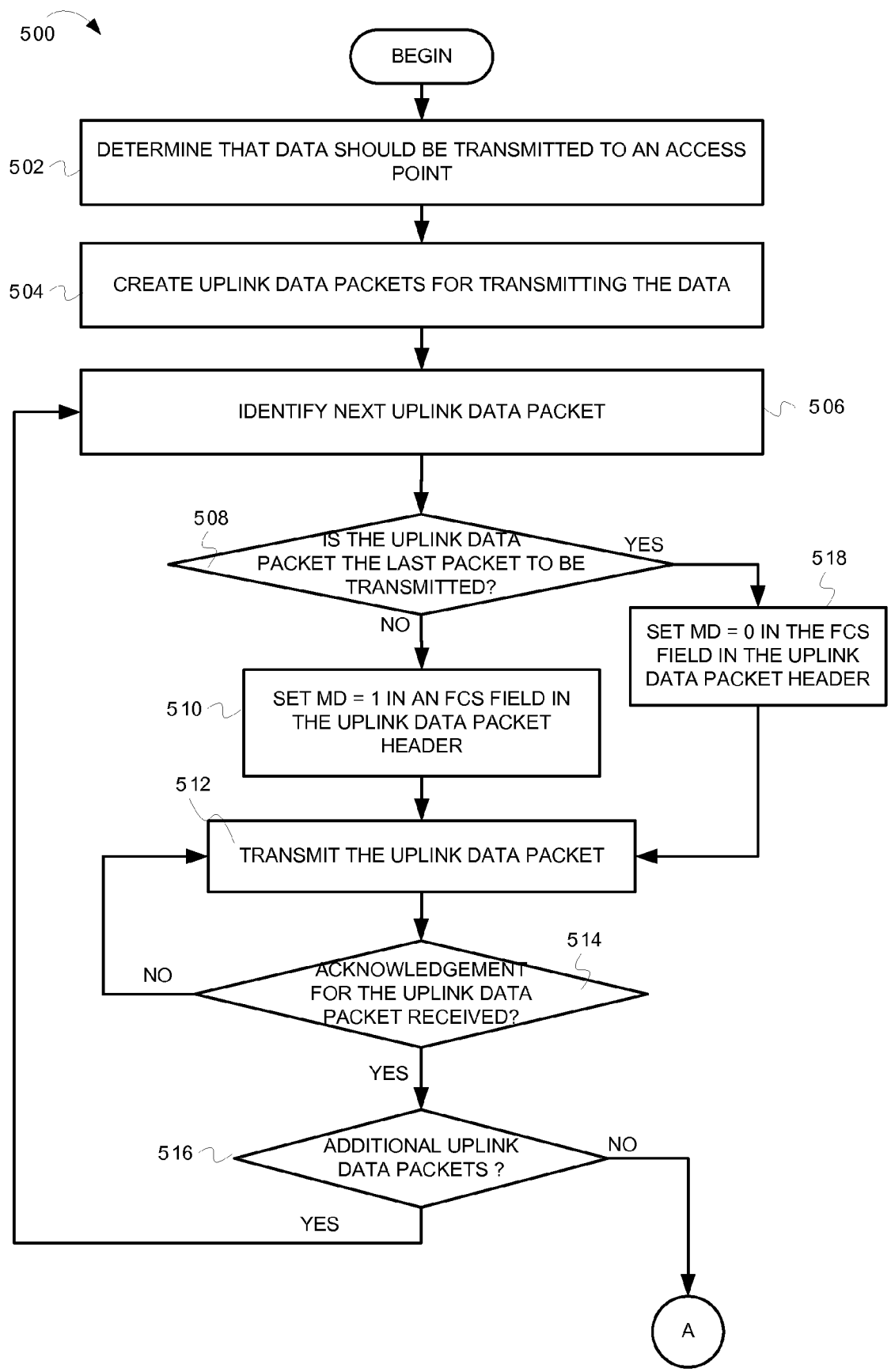
FIG. 5 is a flow diagram illustrating example operations for a WLAN device configured in a No Data Defer End of Service Period (NDDE) mode.
Figure 6:
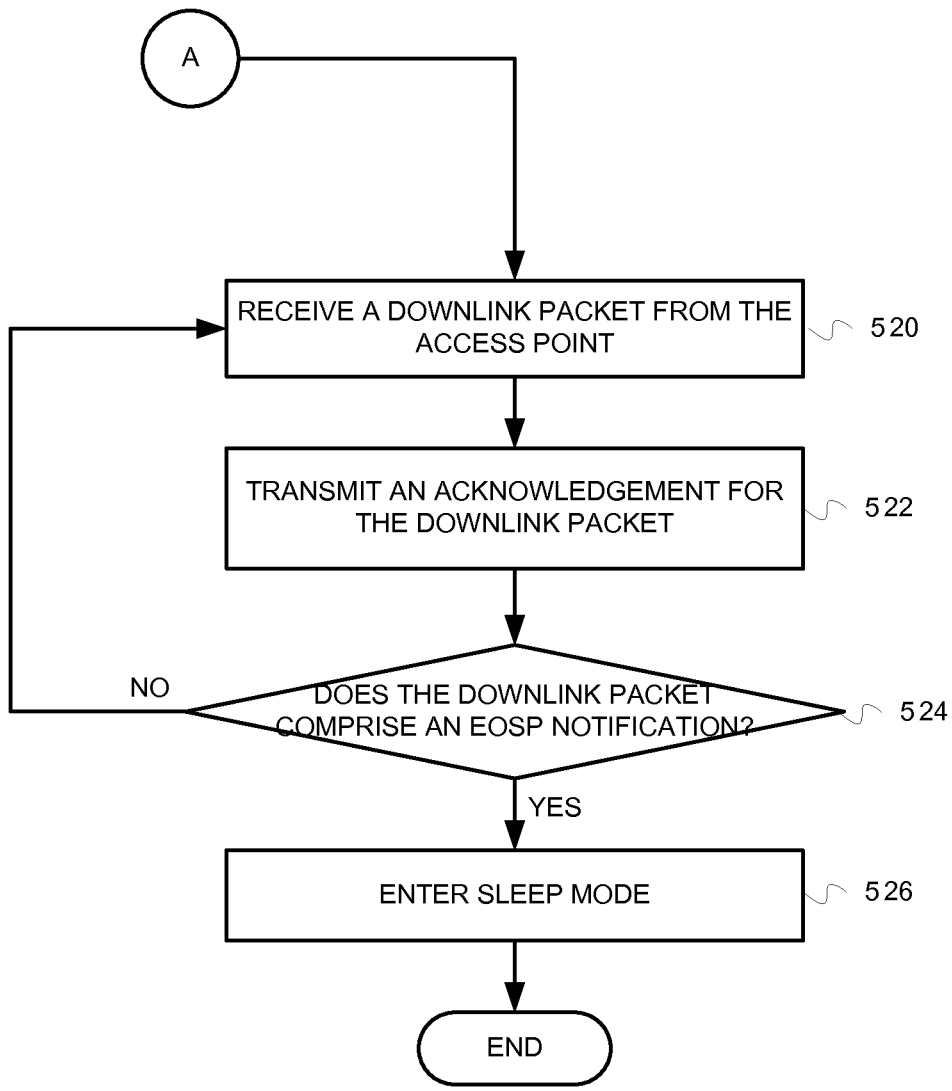
FIG. 6 is a flow diagram illustrating example operations for a WLAN device configured in the NDDE mode.

FIG. 5 and FIG. 6 are flow diagrams illustrating example operations for a WLAN device configured in a No Data Defer End of service period (NDDE) mode. In the NDDE mode, an access point defers transmitting an end of service period (ESOP) notification when there is no buffered downlink data for the WLAN device. After the access point determines that the WLAN device has completed transmitting uplink data packets, the access point transmits the EOSP notification. Flow 500 begins at block 502 in FIG. 5.

At block 502, it is determined that data should be transmitted to an access point. In one implementation, the power saving unit 114 of FIG. 1 may determine that data should be transmitted to the access point 102 based on querying a WLAN data buffer, directing a processing unit 112 to identify the data to be transmitted, monitoring a WLAN transmit queue, etc. In another implementation, the processing unit 112 may determine that there exists data to be transmitted and notify the power saving unit 114. The flow continues at block 504.

At block 504, uplink data packets for transmitting the data are created. In one implementation, the processing unit 112 may create the uplink data packets for transmitting the data to the access point 102. In some implementations, the power saving unit 114 may detect the data to be transmitted (e.g., based on querying the WLAN data buffer) and direct the processing unit 112 to exit a low powered inactive state and create the uplink data packets. The processing unit 114 may create the uplink data packets by retrieving a fragment of the data that can be transmitted in a single uplink data packet, encrypting the data fragment, creating data integrity checks (e.g., checksum), and encapsulating the encrypted data in one or more packet headers. The flow continues at block 506.

At block 506, a next uplink data packet is identified. For example, the processing unit 112 may identify the next uplink packet from the WLAN transmit queue. The flow continues at block 508.

At block 508, it is determined whether the next uplink data packet is the last packet to be transmitted. For example, the processing unit 112 may access the WLAN transmit queue to determine whether the next uplink data packet is the last packet to be transmitted. In some implementations, the power saving unit 114 may access the WLAN transmit queue, determine whether the uplink data packet is the last packet to be transmitted, and accordingly direct operations of the processing unit 112. If it is determined that the uplink data packet is the last packet to be transmitted, the flow continues at block 518. Otherwise, the flow continues at block 510.

At block 510, a more data bit in a frame control field is set to "1" (MD=1) in a header of the uplink data packet. As described earlier, in some implementations, the MD bit can be used to indicate whether or not there exist additional uplink data packets to be transmitted to the access point. In one implementation, the power saving unit 114 can direct the processing unit 112 to set MD=1 in the uplink data packet's header. By setting MD=1, the processing unit 112 informs the access point 102 that the processing unit 112 will transmit additional uplink data packets. Additionally, the processing unit 112 may also set a power management flag to "0" (PM=0) to indicate that WLAN device 110 will remain in an active state. The flow continues at block 512.

At block 518, the MD bit in the frame control field is set to "0" in the header of the uplink data packet. For example, the power saving unit 114 can direct the processing unit 112 to set MD=0 in the uplink data packet's header. By setting MD=0, the processing unit 112 informs the access point 102 that no additional uplink data packets will be transmitted to the access point 102. The access point 102 may transmit downlink data packets (if available) to the WLAN device 110 after the WLAN device transmits the MD=0 indication to the access point 102. Additionally, the processing unit 112 may also set the PM flag to "0" to indicate that WLAN device 110 will remain in an active state to receive downlink packets from the access point 102. The flow continues at block 512.

At block 512, the uplink data packet is transmitted. For example, the processing unit 112 may transmit the uplink data packet to the access point 102. The flow continues at block 514.

At block 514, it is determined whether an acknowledgment for the uplink data packet has been received. For example, the processing unit 112 may determine whether or not the acknowledgement for the uplink data packet has been received from the access point 102. If it is determined that the acknowledgment for the uplink data packet has been received, the flow continues at block 516. Otherwise, the flow continues at block 512, where processing unit 112 retransmits the uplink data packet.

At block 516, it is determined whether there exist additional uplink data packets. In one implementation, the processing unit 112 may determine whether there exist additional uplink data packets to be transmitted to the access point 102. The processing unit 112 may access the WLAN transmit queue to determine whether the WLAN transmit queue comprises additional uplink data packets. In other implementations, the power saving unit 114 may access the WLAN transmit queue, determine whether there exist uplink data packets to be transmitted, and accordingly control the operations of the processing unit 112. If it is determined that there exist uplink data packets to be transmitted, the flow continues at block 506, where the next uplink data packet is retrieved. It is also determined and accordingly indicated, to the access point 102, whether the next uplink data packet is the last packet. Otherwise, the flow continues at block 520 in FIG. 6.

At block 520, a downlink packet is received from the access point. For example, the processing unit 112 may receive the downlink packet from the access point. The downlink packet may be a downlink data packet comprising buffered downlink data for the WLAN device 110. Alternately, the downlink packet may be an empty packet indicating that the access point 102 does not have buffered downlink data for the WLAN device. The flow continues at block 522.

At block 522, an acknowledgement for the downlink packet is transmitted. For example, the processing unit 112 may transmit the acknowledgement for the downlink packet to the access point 102. The flow continues at block 524.

At block 524, it is determined whether the downlink packet comprises an EOSP notification. In some implementations, the processing unit 112 may determine whether the downlink packet comprises the EOSP notification and accordingly notify the power saving unit 114. In another implementation, the power saving unit 114 may determine whether the downlink packet comprises the EOSP notification and accordingly direct the processing unit 114 to enter the sleep mode or remain in an active state. The EOSP notification may be identified be checking a status of an EOSP flag in a QoS frame. The ESOP flag being equal to "1" (EOSP=1) may indicate that the access point 102 has no additional buffered downlink data for the WLAN device 110. If it is determined that the downlink packet comprises the EOSP notification, the flow continues at block 526. Otherwise, the flow continues at block 520, where a next downlink data packet is received from the access point 102.

At block 526, the WLAN device enters sleep mode. For example, the power saving unit 114 may direct the processing unit 112 to enter the sleep mode in response to receiving the EOSP notification from the access point 102. From block 526, the flow ends.

Figure 7:
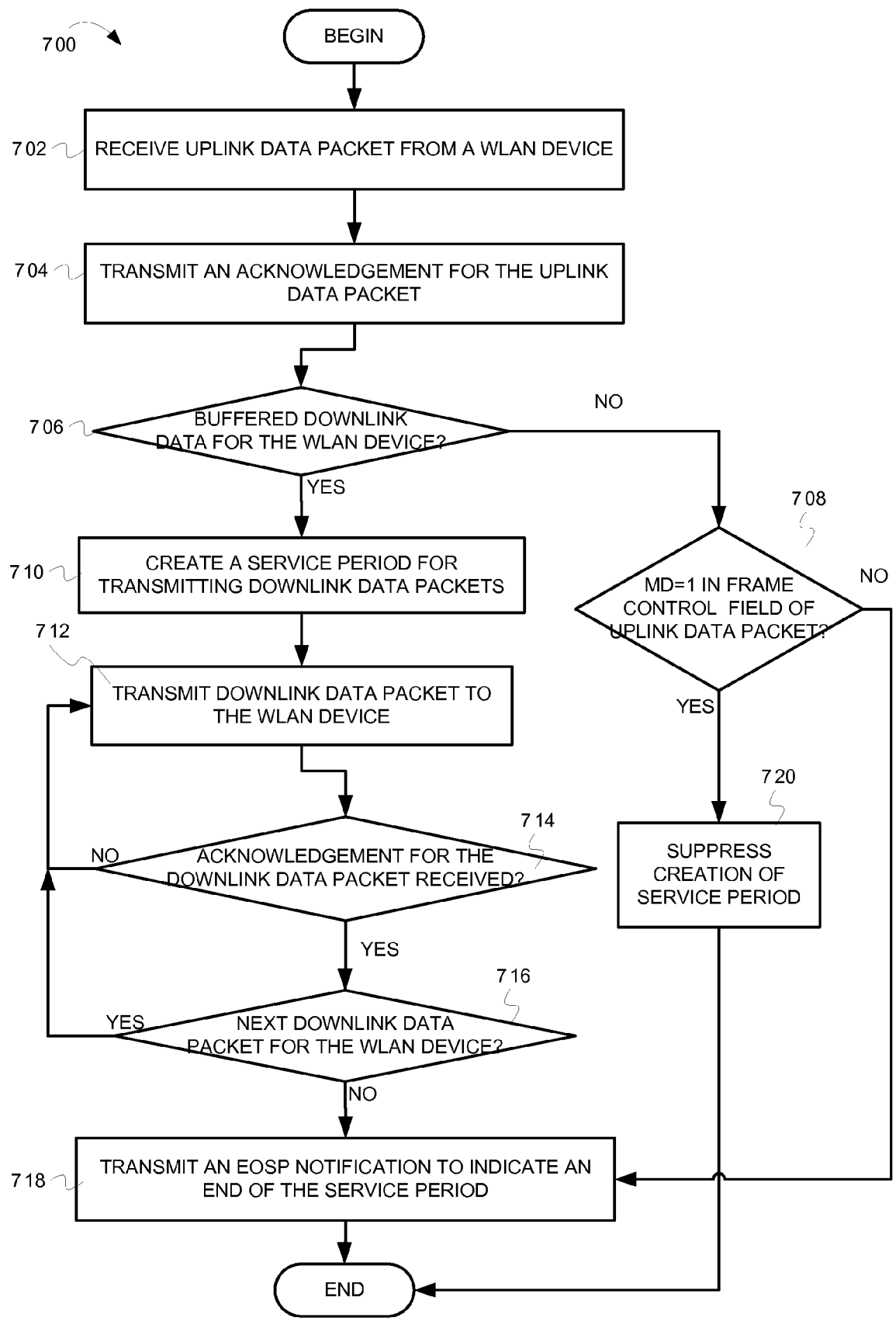
FIG. 7 is a flow diagram illustrating example operations for an access point in an NDDE mode.

FIG. 7 is a flow diagram illustrating example operations for an access point in an NDDE mode. Flow 700 begins at block 702.

At block 702, an uplink data packet is received from a WLAN device. For example, the access point processing unit 108 of FIG. 1 may receive the uplink data packet from the WLAN device 110. The uplink data packet may be used as an indication that the WLAN device 110 is no longer in a low power inactive state. The uplink data packet may also serve as an indication that downlink data packets (if any) may be transmitted to the WLAN device 110. The flow continues at block 704.

At block 704, an acknowledgement for the uplink data packet is transmitted. For example, the access point processing unit 108 may transmit the acknowledgement for the uplink data packet to the WLAN device 110. The flow continues at block 706.

At block 706, it is determined whether there exists buffered downlink data for the WLAN device. In one implementation, on receiving the uplink data packet, the power saving unit 106 may direct the access point processing unit 108 to determine whether there exists buffered downlink data for the WLAN device 110. The access point processing unit 108 may access a data buffer 104 to determine whether there exists buffered downlink data for the WLAN device 110. In another implementation, the access point processing unit 108 may access a transmit queue to determine whether there exist downlink data packets comprising the buffered downlink data for the WLAN device. If it is determined that there exists buffered downlink data for the WLAN device, the flow continues at block 710. Otherwise, the flow continues at block 708.

At block 710, a service period for transmitting the downlink data packets is created. For example, the access point processing unit 108 may create the service period for transmitting the downlink data packets to the WLAN device 110. The service period can indicate a time interval during which the access point 102 transmits, to the WLAN device 110, the downlink data packets comprising the buffered downlink data. The flow continues at block 712.

At block 712, a downlink data packet is transmitted to the WLAN device. For example, the access point processing unit 108 of FIG. 1 may transmit the downlink data packet to the WLAN device 110. The access point processing unit 108 may identify the next downlink data packet from the transmit queue. In some implementations, the access point processing unit 108 may retrieve (from the data buffer 104) a part or all of the buffered data to be transmitted and encapsulate the data in packet headers to create the next downlink data packet. The flow continues at block 714.

At block 714, it is determined whether an acknowledgment for the downlink data packet is received from the WLAN device. For example, the access point processing unit 108 may determine whether the acknowledgment for the downlink data packet has been received from the WLAN device 110. If it is determined that the acknowledgment for the downlink data packet has been received, the flow continues at block 716. Otherwise, the flow loops back and continues at block 712, where the downlink data packet is retransmitted to the WLAN device 110.

At block 716, it is determined whether there exists a next downlink data packet for the WLAN device. In one implementation, the access point processing unit 108 may access the data buffer 104 and determine whether there exists buffered downlink data for the next downlink data packet for the WLAN device 110. In another implementation, the power saving unit 106 can query the transmit queue, determine whether or not there exists the next downlink data packet for the WLAN device 110, and accordingly control the operations of the access point processing unit 108. If it is determined that there exists the next downlink data packet for the WLAN device 110, the flow continues at block 712, where the access point processing unit 108 retrieves and transmits the next downlink data packet to the WLAN device 110. Otherwise, the flow continues at block 718.

At block 718, an EOSP notification is transmitted to indicate an end of the service period. In one implementation, the power saving unit 114 can direct the access point processing unit 108 to indicate the end of the service period. The flow 700 also moves from block 708 to block 712 if it is determined that there is no buffered data for the WLAN device 110 and that the WLAN device 110 has complete transmission of uplink data packets (indicated by MD=1). The EOSP notification may be transmitted in a QoS frame as part of a last downlink data packet transmitted to the WLAN device 110. In some implementations, the access point processing unit 108 may create a QoS Null frame and indicate the end of the service period with the EOSP notification after transmitting the last downlink data packet. However, if there are no downlink data packets, the access point may transmit the EOSP notification in the QoS Null frame after transmitting an acknowledgement for a last uplink data packet. By indicating the end of the service period, the access point 102 can direct the WLAN device 110 to enter the sleep mode. For example, the WLAN device 110 may enter the sleep mode soon after transmitting an acknowledgement for the EOSP notification. From block 718, the flow ends.

At block 708, it is determined whether the MD bit equals "1" in a frame control field of the uplink data packet. For example, the power saving unit 106 may determine whether MD=1 in the uplink data packet header. In some implementations, the access point processing unit 108 may retrieve the value of the MD bit from the frame control field in the uplink data packet header and transmit the value of the MD bit to the power saving unit 106. The power saving unit 106 may instruct the access point processing unit 108 regarding further operations based on the value of the MD bit. For example, if MD=1, the power saving unit 106 may direct the access point processing unit 108 to defer transmitting the downlink data packets. If it is determined that the MD bit equals "1" in the frame control field of the uplink data packet, the flow continues at block 720. Otherwise, the flow continues at block 718, where the EOSP notification is transmitted.

At block 720, creation of the service period is suppressed. For example, the power saving unit 106 may direct the access point processing unit 108 to not create the service period for transmitting the downlink data packets. The service period may not be created if there are no downlink data packets to be transmitted to the WLAN device and if the WLAN device will transmit additional uplink data packets. The power saving unit 106 may direct the access point processing unit 108 to not create the service period unless there exist downlink data packets for the WLAN device and/or all the uplink data packets from the WLAN device have been successfully received. From block 720, the flow ends.

Figure 8A:
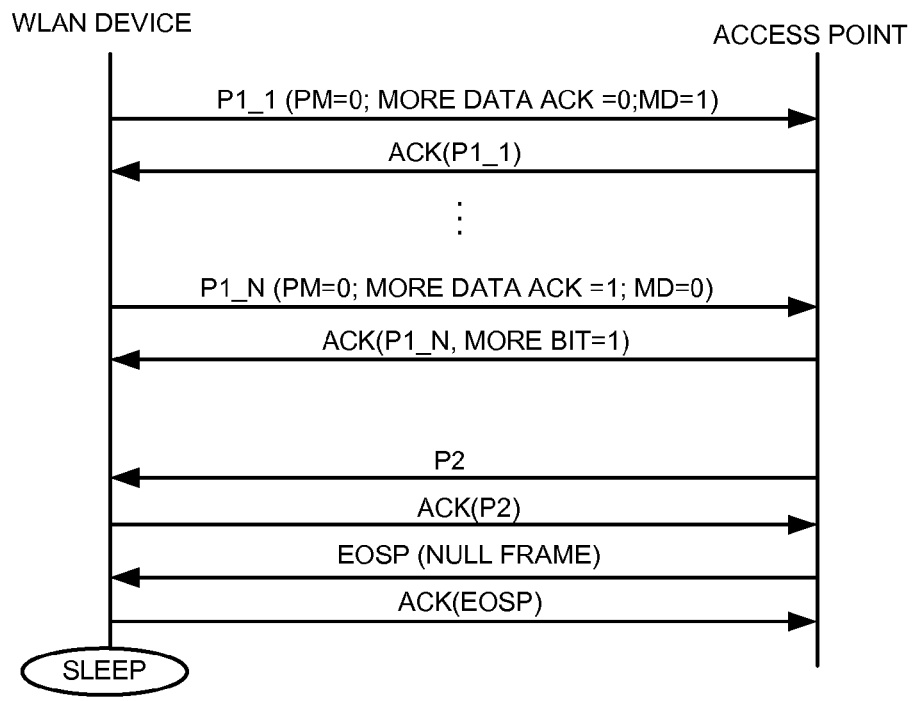
FIG. 8A is a sequence diagram illustrating operations for a WLAN device and an access point configured in an NDNS mode.

FIG. 8A is a sequence diagram illustrating operations for a WLAN device and an access point configured in an NDNS mode. FIG. 8A depicts communication between the WLAN device (e.g., the WLAN device 110 of FIG. 1) and the access point (e.g., the access point 102). The WLAN device 110 determines that N uplink data packets should be transmitted to the access point 102. The N packets may be fragments of a large packet. As indicated in FIG. 8A, the WLAN device 110 transmits packet P1_1 to the access point 102. Packet P1_1 is a first fragment of packet P1. In the packet P1_1, the WLAN device 110 indicates PM=0, MD_ACK=0, and MD=1 indicating that 1) the WLAN device 110 will not be in power save mode, 2) the access point 102 should not identify and transmit downlink data packets, and 3) the WLAN device 110 will be transmitting a next uplink data packet, respectively. The access point 102 receives the packet P1_1 and transmits an acknowledgement for the packet as indicated by ACK(P1_1). The access point 102 may not transmit the downlink data packets even if there exist downlink data packets for the WLAN device 110. The access point 102 may also not create a service period or indicate the presence or absence of the downlink data packets. After receiving an acknowledgement for previously transmitted uplink data packets, the WLAN device 110 transmits packet P1_N to the access point. Packet P1_N is a last fragment of the packet P1. In the packet P1_N, the WLAN device 110 indicates PM=0, MD_ACK=1, and MD=0 indicating that 1) the WLAN device 110 will remain in an active state to receive packets (e.g., downlink data packets, acknowledgement packets, etc.) from the access point, 2) the access point 102 should locate and transmit downlink data packets if available, and 3) the WLAN device 110 will not transmit additional uplink data packets to the access point 102, respectively. Operations for the WLAN device 110 transmitting uplink data packets to the access point 102 in the NDNS mode are described in greater detail above with reference to FIGS. 2-3.

The access point 102 receives the packet P1_N, determines that there exist downlink data packets for the WLAN device 110, and indicates this in an acknowledgement for the packet as depicted by ACK(P1_N, More bit=1). By setting the more bit (MB) in the acknowledgment equal to "1", the access point 102 indicates availability of the downlink data packets to the WLAN device 110. The access point 102 transmits packet P2 to the WLAN device 110. The WLAN device 110 responds to the packet P2 with an acknowledgment ACK(P2). To indicate that the access point 102 will not be transmitting further downlink data packets, the access point 102 creates a QoS Null frame with an EOSP notification. This WLAN device 110 receives the EOSP notification, transmits an acknowledgement represented as ACK(EOSP), and enters the sleep mode. Operations for the access point 102 transmitting downlink data packets to the WLAN device 110 in the NDNS mode are described in greater detail above with reference to FIG. 4.

Figure 8B:
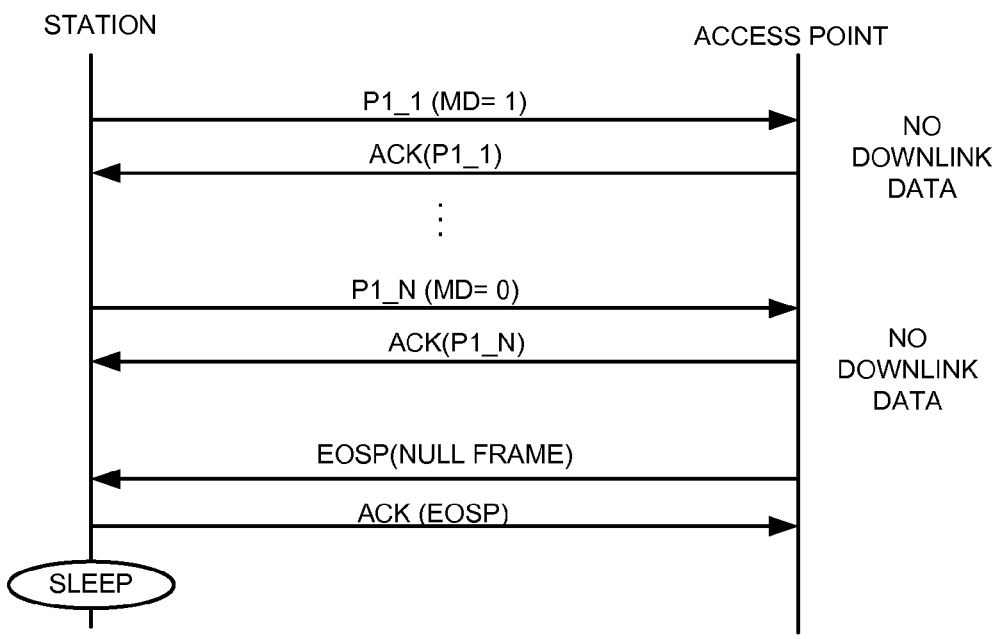
FIG. 8B is a sequence diagram illustrating operations for a WLAN device and an access point configured in an NDDE mode.

FIG. 8B is a sequence diagram illustrating operations for a WLAN device and an access point configured in an NDDE mode. FIG. 8B depicts communication between the WLAN device (e.g., the WLAN device 110 of FIG. 1) and the access point (e.g., the access point 102). The WLAN device 110 determines that N uplink data packets are to be transmitted to the access point 102. As indicated in FIG. 8B, the WLAN device 110 transmits packet P1_1 to the access point 102. Packet P1_1 is a first fragment of packet P1. In the packet P1_1, the WLAN device indicates MD=1 notifying the access point 102 that there exist additional uplink data packets to be transmitted. The access point 102 receives the packet P1_1 and transmits an acknowledgement for the packet as depicted by ACK(P1_1). Because there are no downlink data packets to be transmitted, the access point 102 suppresses creating a service period to indicate the absence of the downlink data packets. After transmitting and receiving acknowledgements for other fragments of packet P1, the WLAN device 110 transmits packet P1_N to the access point 102. Packet P1_N is a last fragment of the packet P1. In the packet P1_N, the WLAN device 110 indicates MD=0 indicating that the WLAN device 110 has no additional uplink data packets to transmit. Operations for the WLAN device 110 transmitting uplink data packets to the access point 102 in NDDE mode are described in greater detail above with reference to FIGS. 5-6.

The access point 102 receives the packet P1_N and transmits an acknowledgement for the packet as depicted by ACK (P1_N). The access point 102 also determines that there are no downlink data packets for the WLAN device 110. The access point 102 creates a service period with a QoS Null frame and an EOSP notification to notify the WLAN device 110 that the access point 102 will not be transmitting downlink data packets. The QoS Null Frame with the EOSP notification transmitted by the access point 102 is represented as EOSP(Null Frame). The WLAN device 110 receives the EOSP notification, transmits an acknowledgement represented as ACK(EOSP), and enters the sleep mode. Operations for the access point 102 transmitting downlink data packets to the WLAN device 110 in the NDDE mode are described in greater detail above with reference to FIG. 7.

It should be noted that the operations described in the flow diagrams (FIG. 2-7) and the sequence diagrams (FIGS. 8A-8B) are examples meant to aid in understanding embodiments, and should not be used to limit embodiments or limit scope of the claims. Embodiments may perform additional operations, fewer operations, operations in a different order, operations in parallel, and some operations differently. For instance, although FIGS. 5-6 (NDDE mode) depicts the access point 102 deferring downlink data packet transmission until the WLAN device 110 has transmitted the uplink data packets and indicated MD=0 in the uplink data packet header, in some implementations, the access point 102 may use the uplink data packet as a trigger and transmit the downlink data packets (if available) soon after transmitting an acknowledgment for the uplink data packet. The access point 102 may transmit available downlink data packets irrespective of the status of the MD bit. In other words, the access point 102 may transmit the downlink data packets even if it is determined that MD=0 (i.e., the WLAN device 110 will transmit additional uplink data packets) as illustrated in FIG. 7. Collision between the uplink and the downlink data packets can be avoided by noting that WLAN protocol is a "listen before talk" protocol. In other words, a transmitting WLAN device (e.g., the WLAN device 110, the access point 102, etc.) senses a communication medium before transmitting packets and transmits the packets only if the communication medium is free from interfering signals. However, in other implementations, the access point 102 may defer transmitting the downlink data packets until it is determined that no additional uplink data packets will be transmitted by the WLAN device 110 (i.e., until the WLAN device 110 transmits an MD=1 indication).

Also, in other implementations, in the NDNS mode described with reference to FIGS. 2-4 and FIG. 8A, the access point 102 may not create a service period, a QoS null frame, or an EOSP notification if there are no downlink data packets to be transmitted. Also, in some implementations, the WLAN device 110 may not set MD=1/MD=0 to indicate whether or not uplink data packets will be transmitted. Instead, the WLAN device 110 may query the access point 102 for downlink data packets after transmitting all the uplink data packets.

It should also be noted that the WLAN device 110 may implement either the NDNS method or NDDE method to enable power saving. The access point 102, however, may be configured to operate in either/both the NDNS and the NDDE mode. The access point 102 may determine its mode of operation (i.e., NDDE or NDNS) based on the power saving mode implemented on the WLAN device 110. For example, the access point 102 may receive an uplink data packet, determine that the NDNS mode is enabled on the WLAN device 110 (e.g., based on identifying MD_ACK=0) and accordingly operate in the NDNS mode. As another example, the access point 102 may receive an uplink data packet, determine that the NDDE power saving mode is enabled based on the access point identifying a more data bit (e.g., MD=1 or MD=0) and accordingly enable the NDDE mode on the access point 102.

Also, FIG. 2 depicts the WLAN device 110 querying the access point 102 for downlink data packets (e.g., by setting MD_ACK=1) as part of the last uplink data packet. However, in some implementation, the WLAN device 110 may not wait until the last uplink data packet to transmit the query for the downlink data packets. Instead, the WLAN device 110 may query the access point 102 for downlink data packets by setting MD_ACK=1 in a header of a first uplink data packet or as part of any suitable uplink data packet. In one implementation, in response to an indication that there exist downlink data packets (e.g., MB=1 in an acknowledgment for an uplink data packet), the WLAN device 110 may defer transmitting uplink data packets until all the downlink data packets have been received and acknowledged. Alternatively, the WLAN device 110 may use the MB=1 indication to determine whether or not and when the WLAN device 110 can enter the sleep mode. In another implementation, the access point 102 may be configured to defer transmitting the downlink data packets until all the uplink data packets have been received and acknowledged.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in machine-readable signal media such as an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
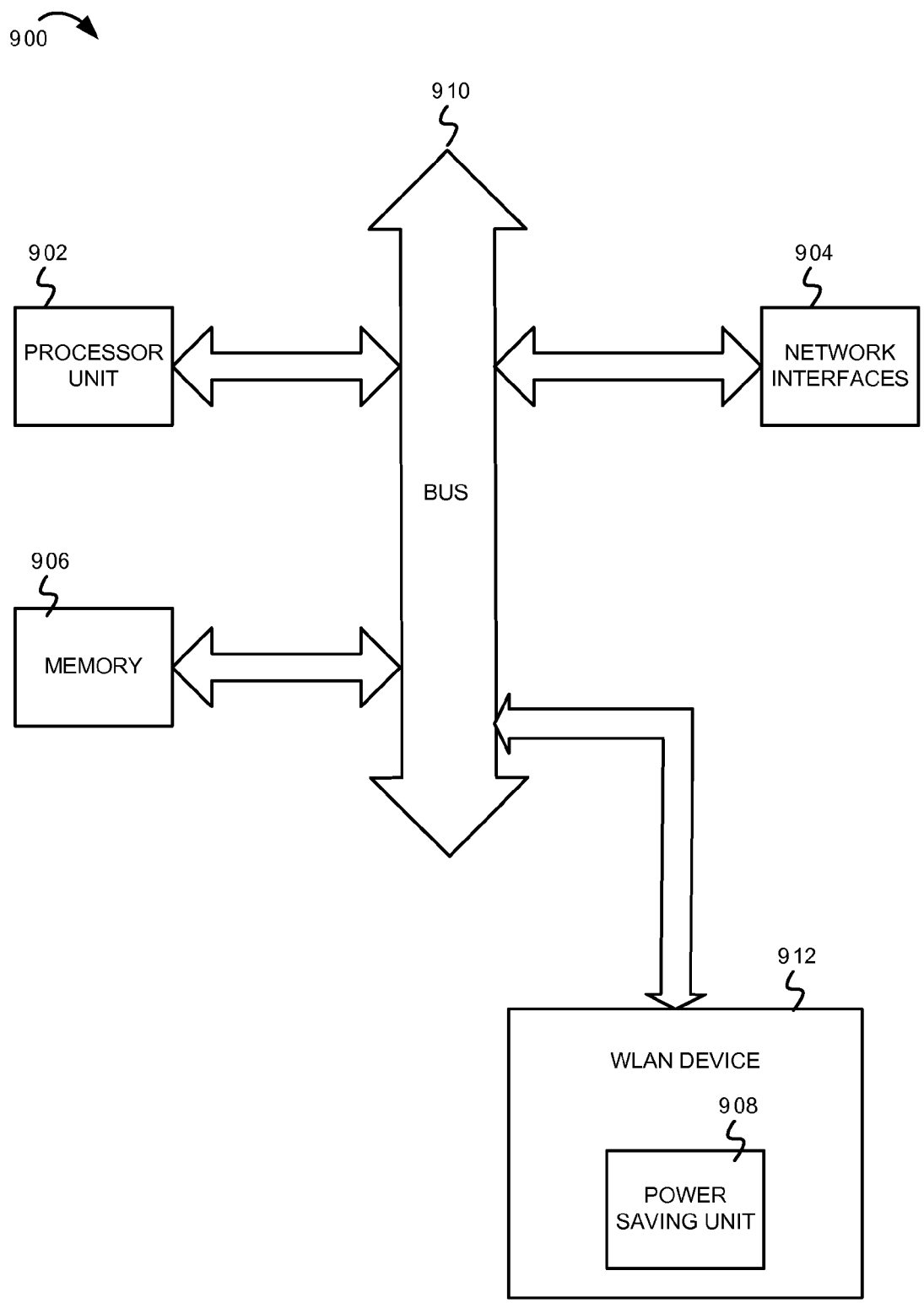
FIG. 9 is a block diagram of one embodiment of an electronic device including a power conservation mechanism in a WLAN device.

FIG. 9 is a block diagram of one embodiment of an electronic device 900 including a power conservation mechanism. In one implementation, the electronic device 900 may be an access point. In another implementation, the electronic device 900 may be one of a personal computer (PC), a laptop, a netbook, a mobile phone, a personal digital assistant (PDA), or other electronic systems comprising a WLAN device 912. The electronic device 900 includes a processor device 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 also includes a bus 910 (e.g., PCI, ISA, PCI-Express, HyperTransport®, Infini- Band®, NuBus, etc.), and network interfaces 904 that include at least one wireless network interface (e.g., a WLAN interface, a Bluetooth® interface, a WiMAX interface, a ZigBee® interface, a Wireless USB interface, etc). The electronic device 900 also comprises the WLAN device 912 for communicating with other WLAN devices, an access point, etc. The WLAN device 912 comprises a power saving unit 908. The power saving unit 908 can implement functionality for indicating an availability of uplink data packets and/or a request to transmit downlink data packets. The power saving unit 908 when implemented on an access point can implement functionality for suppressing or deferring creation of a service period and transmitting an EOSP notification if there are no downlink data packets for the WLAN device. The power saving unit 908 also implements functionality to transmit the downlink data packets in accordance with indications transmitted by the WLAN device in uplink data packets as described with reference to FIGS. 1-8B.

It should be noted that any one of the above-described functionalities might be partially (or entirely) implemented in hardware and/or on the processing unit 902. For example, the functionality may be implemented with an application specific integrated circuit, in logic implemented in the processing unit 902, in a co-processor on a peripheral device or card, etc. Further, realizations may include fewer or additional components not illustrated in FIG. 9 (e.g., additional network interfaces, peripheral devices, etc.). The processor unit 902 and the network interfaces 904 are coupled to the bus 910. Although illustrated as being coupled to the bus 910, the memory 906 may be coupled to the processor unit 902.

While the embodiments are described with reference to various implementations and exploitations, it will be understood that these embodiments are illustrative and that the scope of the inventive subject matter is not limited to them. In general, a power save mechanism for wireless device uplink and downlink traffic as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    receiving, at an access point, an uplink data packet from a wireless local area network (WLAN) device, wherein uplink data is data that is received by the access point from the WLAN device;
    determining, based on a first indicator in the uplink data packet, whether the WLAN device has an additional uplink data packet to transmit to the access point;
    determining, in response to receiving a second indicator in the uplink data packet, whether the access point has a downlink data packet to transmit to the WLAN device, wherein downlink data is data that is transmitted by the access point to the WLAN device; and
    suppressing creating a service period at the access point and suppressing transmitting an indication of an end of the service period from the access point, in response to determining that the WLAN device has an additional uplink data packet to transmit to the access point and in response to determining that the access point does not have a downlink data packet to transmit to the WLAN device.

2. The method of claim 1, wherein said determining, in response to receiving the second indicator in the uplink data packet, whether the access point has a downlink data packet to transmit to the WLAN device further comprises one of:
    determining whether the second indicator in the uplink data packet indicates whether the access point should determine availability of a downlink data packet, and
    determining based on the second indicator in the uplink data packet whether the access point should transmit the downlink data packet to the WLAN device.

3. The method of claim 1, wherein said determining, based on the first indicator in the uplink data packet, whether the WLAN device has an additional uplink data packet to transmit to the access point, further comprises:
    reading a value of the first indicator in a header of the uplink data packet;
    creating the service period and transmitting the indication of the end of the service period in response to determining a first value of the first indicator in the header of the uplink data packet, wherein the first value of the first indicator indicates that the WLAN device does not have an additional uplink data packet to transmit to the access point; and
    suppressing creating the service period in response to determining a second value of the first indicator in the header of the uplink data packet, wherein the second value of the first indicator indicates that the WLAN device has an additional uplink data packet to transmit to the access point.

4. The method of claim 3, wherein said creating the service period and transmitting the indication of the end of the service period further comprises:
    determining whether the access point has a downlink data packet to transmit to the WLAN device;
    transmitting, during the service period, the downlink data packet in response to determining that the access point has the downlink data packet to transmit to the WLAN device; and
    transmitting the indication of the end of the service period in response to determining that the access point does not have the downlink data packet to transmit to the WLAN device.

5. The method of claim 1, wherein said determining, in response to receiving the second indicator in the uplink data packet, whether the access point has a downlink data packet to transmit to the WLAN device comprises:
    reading a value of the second indicator in a header of the uplink data packet;
    determining whether the access point has a downlink data packet to transmit to the WLAN device in response to determining a first value of the second indicator in the header of the uplink data packet, wherein the first value of the second indicator indicates that the access point should determine availability of the downlink data packet and indicate the availability of the downlink data packet to the WLAN device; and
    transmitting an acknowledgement for the uplink data packet without determining whether the access point has the downlink data packet to transmit to the WLAN device in response to determining a second value of the second indicator in the header of the uplink data packet, wherein the second value of the second indicator indicates that the access point should not determine the availability of the downlink data packet.

6. The method of claim 5, wherein said determining whether the access point has the downlink data packet to transmit to the WLAN device further comprises:
indicating, to the WLAN device, a first value of a first bit in a header of the acknowledgement for the uplink data packet in response to determining that the access point does not have the downlink data packet to transmit to the WLAN device, wherein the first value of the first bit indicates that the access point does not have the downlink data packet to transmit to the WLAN device;
indicating, to the WLAN device, a second value of the first bit in the header of the acknowledgement for the uplink data packet in response to determining that the access point has the downlink data packet to transmit to the WLAN device, wherein the second value of the first bit indicates that the access point has the downlink data packet to transmit to the WLAN device;
creating the service period for transmitting the downlink data packet to the WLAN device; and
transmitting the indication of the end of the service period in response to determining that the access point does not have additional downlink data packets for the WLAN device.

7. The method of claim 5, further comprising:
suppressing the creation of the service period based on one of determining that the access point does not have the downlink data packet to transmit to the WLAN device and determining the second value of the second indicator in the header of the uplink data packet.

8. The method of claim 1, further comprising:
receiving, at the access point, a second uplink data packet from a second WLAN device;
determining whether the access point has a second downlink data packet to transmit to the second WLAN device in response to receiving the second uplink data packet;
creating a second service period for transmitting the second downlink data packet to the second WLAN device if it is determined that the access point has the second downlink data packet to transmit to the second WLAN device; and
suppressing, at the access point, the creating the second service period if it is determined that the access point does not have the second downlink data packet to transmit to the second WLAN device.

9. The method of claim 1, wherein in response to determining that the access point has the downlink data packet to transmit to the WLAN device, the method further comprises:
transmitting the downlink data packet to the WLAN device irrespective of whether the WLAN device has additional uplink data packets for the access point.

10. The method of claim 1, further comprising:
receiving, at the access point, a second uplink data packet from the WLAN device;
determining that the access point does not have a downlink data packet for the WLAN device;
transmitting an acknowledgement to the WLAN device for the second uplink data packet;
suppressing creating a second service period at the access point in response to said determining that the access point does not have a downlink data packet for the WLAN device;
determining that the WLAN device does not have additional uplink data packets to transmit to the access point; and
transmitting an end of service period notification to the WLAN device.

11. A method comprising:
transmitting, from a WLAN device, an uplink data packet to an access point, wherein uplink data is data that is transmitted by the WLAN device to the access point;
determining whether the uplink data packet is a last uplink data packet for the access point;
indicating in the uplink data packet whether or not the uplink data packet is the last uplink data packet for the access point;
indicating in the uplink data packet whether or not the access point should determine and indicate availability of downlink data packets for the WLAN device;
determining whether an acknowledgement for the uplink data packet, received from the access point, indicates an availability of a downlink data packet in response to indicating in the uplink data packet that the access point should determine and indicate availability of downlink data packets for the WLAN device, wherein downlink data is data that is received by the WLAN device from the access point;
in response to determining that the uplink data packet is not the last uplink data packet of the WLAN device for the access point and in response to determining that the access point has one or more downlink data packets for the WLAN device, deferring transmission of subsequent uplink data packets to the access point;
receiving the one or more downlink data packets from the access point in response to determining that the acknowledgement for the uplink data packet indicates the availability of the downlink data packet;
determining that the access point does not have additional downlink data packets for the WLAN device;
resuming transmission of the subsequent uplink data packets to the access point; and
causing the WLAN device to enter an inactive state in response to determining that the uplink data packet is the last uplink data packet for the access point and determining that the acknowledgement for the uplink data packet indicates that the access point does not have an available downlink data packet.

12. The method of claim 11, wherein said indicating in the uplink data packet whether or not the uplink data packet is the last uplink data packet for the access point further comprises:
setting a first value of a first bit in a header of the uplink data packet if it is determined that the uplink data packet is the last uplink data packet for the access point, wherein the first value of the first bit indicates that the uplink data packet is the last uplink data packet for the access point; and
setting a second value of the first bit in the header of the uplink data packet if it is determined that the uplink data packet is not the last uplink data packet for the access point, wherein the second value of the first bit indicates that the uplink data packet is not the last uplink data packet for the access point.

13. The method of claim 11, further comprises one of:
setting a first value of a first bit in a header of the uplink data packet, wherein the first value of the first bit indicates that the access point should determine and indicate the availability of the downlink data packet in the acknowledgement for the uplink data packet; and setting a second value of the first bit in the header of the uplink data packet, wherein the second value of the first bit indicates that the access point should not determine the availability of the downlink data packet.

14. The method of claim 13, wherein said determining whether the acknowledgement for the uplink data packet indicates the availability of the downlink data packet is in response to the setting the first value of the first bit in the header of the uplink data packet and further comprises:
reading a second bit in a header of the acknowledgement for the uplink data packet;
determining that the access point has the downlink data packet to transmit to the WLAN device in response to determining a first value of the second bit in the header of the acknowledgement for the uplink data packet, wherein the first value of the second bit indicates the availability of the downlink data packet; and
determining that the access point does not have the downlink data packet to transmit to the WLAN device in response to determining a second value of the second bit in the header of the acknowledgement for the uplink data packet, wherein the second value of the second bit indicates that the access point does not have the downlink data packet to transmit to the WLAN device.

15. The method of claim 11, further comprising:
determining whether the downlink data packet from the access point comprises an end of a service period notification, wherein the end of the service period notification indicates that the downlink data packet is the last packet for the WLAN device;
receiving a second downlink data packet from the access point in response to determining that the downlink data packet from the access point does not comprise the end of the service period notification; and
causing the WLAN device to enter the inactive state in response to determining that the downlink data packet from the access point comprises the end of the service period notification.

16. The method of claim 11, further comprising modifying a power management bit to indicate that the WLAN device is in one of an active state and an inactive state.

17. An access point comprising:
an access point processing unit configured to receive an uplink data packet from a wireless local area network (WLAN) device, wherein uplink data is data that is received by the access point from the WLAN device;
a power saving unit operable to:
determine, based on a first indicator in the uplink data packet, whether the WLAN device has an additional uplink data packet to transmit to the access point;
determine, in response to receiving a second indicator in the uplink data packet, whether the access point has a downlink data packet to transmit to the WLAN device, wherein downlink data is data that is transmitted by the access point to the WLAN device; and
suppress creating a service period and suppress transmitting an indication of an end of the service period in response to the power saving unit determining that the WLAN device has an additional uplink data packet to transmit to the access point and in response to the power saving unit determining that the access point does not have a downlink data packet to transmit to the WLAN device.

18. The access point of claim 17, wherein the power saving unit operable to determine, based on the first indicator in the uplink data packet, whether the WLAN device has an additional uplink data packet to transmit to the access point, further comprises the power saving unit operable to:
read a value of the first indicator in a header of the uplink data packet;
create the service period and transmit the indication of the end of the service period in response to the power saving unit determining a first value of the first indicator in the header of the uplink data packet, wherein the first value of the first indicator indicates that the WLAN device does not have an additional uplink data packet to transmit to the access point; and
suppress creating the service period in response to the power saving unit determining a second value of the first indicator in the header of the uplink data packet, wherein the second value of the first indicator indicates that the WLAN device has an additional uplink data packet to transmit to the access point.

19. The access point of claim 17, wherein the power saving unit operable to determine, in response to receiving the second indicator in the uplink data packet, whether the access point has a downlink data packet to transmit to the WLAN device comprises the power saving unit operable to:
read a value of the second indicator in a header of the uplink data packet;
determine whether the access point has a downlink data packet to transmit to the WLAN device in response to the power saving unit determining a first value of the second indicator in the header of the uplink data packet, wherein the first value of the second indicator indicates that the access point should determine availability of the downlink data packet and indicate the availability of the downlink data packet to the WLAN device; and
transmit an acknowledgement for the uplink data packet without determining whether the access point has the downlink data packet to transmit to the WLAN device in response to the power saving unit determining a second value of the second indicator in the header of the uplink data packet, wherein the second value of the second indicator indicates that the access point should not determine whether the availability of the downlink data packet.

20. The access point of claim 19, wherein the power saving unit operable to determine whether the access point has the downlink data packet to transmit to the WLAN device further comprises the power saving unit operable to:
indicate, to the WLAN device, a first value of a first bit in a header of the acknowledgement for the uplink data packet in response to the power saving unit determining that the access point does not have the downlink data packet to transmit to the WLAN device, wherein the first value of the first bit indicates that the access point does not have the downlink data packet to transmit to the WLAN device;
indicate, to the WLAN device, a second value of the first bit in the header of the acknowledgement for the uplink data packet in response to the power saving unit determining that the access point has the downlink data packet to transmit to the WLAN device, wherein the second value of the first bit indicates that the access point has the downlink data packet to transmit to the WLAN device;
create the service period for transmitting the downlink data packet to the WLAN device; and
transmit the indication of the end of the service period in response to the power saving unit determining that the access point does not have additional downlink data packets for the WLAN device.

21. One or more non-transitory machine-readable storage media having instructions stored therein, which when executed by one or more processors causes the one or more processors to perform operations that comprise:
- determining, based on a first indicator in an uplink data packet received at an access point from a wireless local area network (WLAN) device, whether the WLAN device has an additional uplink data packet to transmit to the access point, wherein uplink data is data that is received by the access point from the WLAN device;
- determining, in response to receiving a second indicator in the uplink data packet, whether the access point has a downlink data packet to transmit to the WLAN device, wherein downlink data is data that is transmitted by the access point to the WLAN device; and
- suppressing creating a service period and suppressing transmitting an indication of an end of the service period in response to determining that the WLAN device has an additional uplink data packet to transmit to the access point and in response to determining that the access point does not have a downlink data packet to transmit to the WLAN device.

22. The machine-readable storage media of claim 21, wherein said operation of determining, based on the first indicator in the uplink data packet, whether the WLAN device has an additional uplink data packet to transmit to the access point, further comprises:
- reading a value of the first indicator in a header of the uplink data packet;
- creating the service period and transmitting the indication of the end of the service period in response to determining a first value of the first indicator in the header of the uplink data packet, wherein the first value of the first indicator indicates that the WLAN device does not have the additional uplink data packet to transmit to the access point; and
- suppressing creating the service period in response to determining a second value of the first indicator in the header of the uplink data packet, wherein the second value of the first indicator indicates that the WLAN device has the additional uplink data packet to transmit to the access point.

23. The machine-readable storage media of claim 22, wherein said operation of creating the service period and transmitting the indication of the end of the service period further comprises:
- determining whether the access point has a downlink data packet to transmit to the WLAN device;
- transmitting, during the service period, the downlink data packet in response to determining that the access point has the downlink data packet to transmit to the WLAN device; and
- transmitting the indication of the end of the service period in response to determining that the access point does not have the downlink data packet to transmit to the WLAN device.

24. The machine-readable storage media of claim 21, wherein said operation of determining, in response to receiving the second indicator in the uplink data packet, whether the access point has a downlink data packet to transmit to the WLAN device comprises:
- reading a value of the second indicator in a header of the uplink data packet;
- determining whether the access point has the downlink data packet to transmit to the WLAN device in response to determining a first value of the second indicator in the header of the uplink data packet, wherein the first value of the second indicator indicates that the access point should determine availability of the downlink data packet and indicate the availability of the downlink data packet to the WLAN device; and
- transmitting an acknowledgement for the uplink data packet without determining whether the access point has the downlink data packet to transmit to the WLAN device response to determining a second value of the second indicator in the header of the uplink data packet, wherein the second value of the second indicator indicates that the access point should not determine the availability of the downlink data packet.

25. The machine-readable storage media of claim 24, wherein said operation of determining whether the access point has the downlink data packet to transmit to the WLAN device further comprises:
- indicating, to the WLAN device, a first value of a first bit in a header of the acknowledgement for the uplink data packet in response to determining that the access point does not have the downlink data packet to transmit to the WLAN device, wherein the first value of the first bit indicates that the access point does not have the downlink data packet to transmit to the WLAN device;
- indicating, to the WLAN device, a second value of the first bit in the header of the acknowledgement for the uplink data packet in response to determining that the access point has the downlink data packet to transmit to the WLAN device, wherein the second value of the first bit indicates that the access point has the downlink data packet to transmit to the WLAN device;
- creating the service period for transmitting the downlink data packet to the WLAN device; and
- transmitting the indication of the end of the service period in response to determining that the access point does not have additional downlink data packets for the WLAN device.

26. The machine-readable storage media of claim 24, wherein the operations further comprise:
- suppressing the creation of the service period based on one of determining that the access point does not have the downlink data packet to transmit to the WLAN device and determining the second value of the second indicator in the header of the uplink data packet.

27. A method comprising:
- receiving, at an access point, an uplink data packet from a wireless local area network (WLAN) device, wherein uplink data is data that is received by the access point from the WLAN device;
- determining, based on information included in the uplink data packet, whether the WLAN device has one or more additional uplink data packets to transmit to the access point;
- determining whether the access point has one or more downlink data packets to transmit to the WLAN device, wherein downlink data is data that is transmitted by the access point to the WLAN device;
- in response to determining that the access point has one or more downlink data packets to transmit to the WLAN device,
  - notifying the WLAN device to cease transmission of one or more uplink data packets;
  - transmitting the one or more downlink data packets to the WLAN device; and
  - notifying the WLAN device to resume transmission of the one or more uplink data packets after said transmitting the one or more downlink data packets to the WLAN device; and in response to determining that the access point does not have one or more downlink data packets to transmit to the WLAN device, suppressing creating a service period at the access point and suppressing transmitting an indication of an end of the service period from the access point, in response to determining that the WLAN device has one or more additional uplink data packets to transmit to the access point.

28. The method of claim 27, wherein after said suppressing creating the service period at the access point and suppressing transmitting the indication of the end of the service period from the access point, the method further comprises:

receiving, at the access point, the one or more additional uplink data packets from the WLAN device, in response to determining that the WLAN device has one or more additional uplink data packets to transmit to the access point.

* * * * *